(12) United States Patent
Ye et al.

(10) Patent No.: US 12,481,124 B2
(45) Date of Patent: Nov. 25, 2025

(54) OPTICAL IMAGING LENS ASSEMBLY

(71) Applicant: Zhejiang Sunny Optics Co., Ltd, Yuyao (CN)

(72) Inventors: Lihui Ye, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 542 days.

(21) Appl. No.: 17/694,921

(22) Filed: Mar. 15, 2022

(65) Prior Publication Data

US 2022/0299734 A1 Sep. 22, 2022

(30) Foreign Application Priority Data

Mar. 16, 2021 (CN) .................. 202110279434.X

(51) Int. Cl.
*G02B 13/18* (2006.01)
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
CPC . G02B 9/00; G02B 9/60; G02B 13/00; G02B 13/001; G02B 13/0015; G02B 13/002; G02B 13/0045; G02B 13/008; G02B 13/14; G02B 13/143; G02B 13/146; G02B 13/18; G02B 27/0025
USPC ......................... 359/714, 753–754, 763–770
See application file for complete search history.

(56) References Cited

U.S. PATENT DOCUMENTS

| | | | | |
|---|---|---|---|---|
| 8,717,687 | B2 * | 5/2014 | Hsu | G02B 9/60 |
| | | | | 359/764 |
| 9,013,810 | B2 | 4/2015 | Ko | |
| 9,389,393 | B2 * | 7/2016 | Ye | G02B 13/0045 |
| 9,513,467 | B2 * | 12/2016 | Kondo | G02B 13/0045 |
| 9,874,719 | B2 * | 1/2018 | Lin | G02B 9/60 |
| 10,001,626 | B2 * | 6/2018 | Chen | G02B 27/0025 |
| 2010/0253829 | A1 * | 10/2010 | Shinohara | G02B 13/0045 |
| | | | | 359/764 |
| 2013/0050847 | A1 * | 2/2013 | Hsu | G02B 9/60 |
| | | | | 359/714 |

(Continued)

FOREIGN PATENT DOCUMENTS

| CN | 101782676 A | 7/2010 |
|---|---|---|
| CN | 111239982 A | 6/2020 |

(Continued)

*Primary Examiner* — Thong Q Nguyen
(74) *Attorney, Agent, or Firm* — Barnes & Thornburg

(57) ABSTRACT

The present disclosure discloses an optical imaging lens assembly including, sequentially from an object side to an image side along an optical axis, a stop; a first lens having refractive power and a convex image-side surface; a second lens having refractive power; a third lens having positive refractive power and a concave image-side surface; a fourth lens having refractive power and a convex image-side surface; and a fifth lens having refractive power. An effective focal length f2 of the second lens and an effective focal length f3 of the third lens satisfy: $1.0<|f3/f2|<5.0$. A center thickness CT4 of the fourth lens along the optical axis and an edge thickness ET4 of the fourth lens satisfy: $2.0<CT4/ET4<4.0$. At least one of an object-side surface of the first lens to an image-side surface of the fifth lens is aspheric.

17 Claims, 14 Drawing Sheets

(56) References Cited

U.S. PATENT DOCUMENTS

| | | | |
|---|---|---|---|
| 2015/0253539 A1* | 9/2015 | Ye | H04N 23/51 |
| | | | 359/764 |
| 2015/0286036 A1* | 10/2015 | Kondo | G02B 13/0045 |
| | | | 359/714 |
| 2021/0048634 A1 | 2/2021 | Sun | |
| 2022/0146794 A1 | 5/2022 | Wang et al. | |

FOREIGN PATENT DOCUMENTS

| | | |
|---|---|---|
| CN | 111856715 A | 10/2020 |
| CN | 112230390 A | 1/2021 |
| TW | 201421065 A | 6/2014 |

* cited by examiner

OPTICAL IMAGING LENS ASSEMBLY

CROSS-REFERENCE TO RELATED APPLICATIONS

This application claims benefit of priority to Chinese Patent Application No. 202110279434.X filed on Mar. 16, 2021 before the China National Intellectual Property Administration, the entire disclosure of which is incorporated herein by reference in its entity.

TECHNICAL FIELD

The present disclosure relates to the field of optical elements, and specifically, relates to an optical imaging lens assembly.

BACKGROUND

With the development of science and technology, the market demand for portable electronic products, such as smart phones with camera functions, is gradually increasing. In order to improve the competitiveness of their own products, major lens assembly manufacturers have gradually begun to develop how to make the optical imaging lens assembly mountable on portable electronic products on the basis of ensuring the image quality of the optical imaging lens assembly.

With the rapid development of the lens assembly field, the image quality of optical imaging lens assemblies mounted on portable electronic products is getting higher and higher. At the same time, users have higher and higher requirements for the miniaturization of optical imaging lens assemblies mounted on portable electronic products. In addition, as the performance of photosensitive elements applied to portable electronic products such as smartphones, such as photosensitive Charge-Coupled Device (CCD) or Complementary Metal-Oxide Semiconductor (CMOS), increases and the size thereof reduces, users have put forward higher requirements for the high image quality and miniaturization of the matching optical imaging lens assembly.

SUMMARY

An aspect of the present disclosure is to provide an optical imaging lens assembly which includes, sequentially along an optical axis from an object side to an image side: a stop, a first lens having positive refractive power or negative refractive power, an image-side surface of the first lens is convex; a second lens having positive refractive power or negative refractive power; a third lens having positive refractive power, an image-side surface of the third lens is concave; a fourth lens having positive refractive power or negative refractive power, an image-side surface of the fourth lens is convex; and a fifth lens having positive refractive power or negative refractive power. An effective focal length f2 of the second lens and an effective focal length f3 of the third lens may satisfy: $1.0 < |f3/f2| < 5.0$. A center thickness CT4 of the fourth lens along the optical axis and an edge thickness ET4 of the fourth lens may satisfy: $2.0 < CT4/ET4 < 4.0$. At least one of an object-side surface of the first lens to an image-side surface of the fifth lens is aspheric.

In one embodiment, a total effective focal length f of the optical imaging lens assembly and a radius of curvature R8 of the image-side surface of the fourth lens may satisfy: $-4.0 < f/R8 < -1.0$.

In one embodiment, a combined focal length f45 of the fourth lens and the fifth lens and a total effective focal length f of the optical imaging lens assembly may satisfy: $1.5 \leq f45/f \leq 2.5$.

In one embodiment, a total effective focal length f of the optical imaging lens assembly, a radius of curvature R2 of the image-side surface of the first lens and a radius of curvature R5 of an object-side surface of the third lens may satisfy: $0 < |f/R2+f/R5| < 1.5$.

In one embodiment, a radius of curvature R4 of an image-side surface of the second lens, a radius of curvature R9 of an object-side surface of the fifth lens and a total effective focal length f of the optical imaging lens assembly may satisfy: $1.5 < |f/R4+f/R9| < 4.0$.

In one embodiment, a distance SAG41 along the optical axis from an intersection of an object-side surface of the fourth lens and the optical axis to a vertex of an effective radius of the object-side surface of the fourth lens and a distance SAG12 along the optical axis from an intersection of the image-side surface of the first lens and the optical axis to a vertex of an effective radius of the image-side surface of the first lens may satisfy: $0.5 < SAG12/SAG41 < 4.0$.

In one embodiment, a maximum effective radius DT32 of the image-side surface of the third lens and half of a diagonal length ImgH of an effective pixel area on an image plane of the optical imaging lens assembly may satisfy: $1.0 < ImgH/DT32 < 2.5$.

In one embodiment, a maximum effective radius DT51 of an object-side surface of the fifth lens and a maximum effective radius DT11 of the object-side surface of the first lens may satisfy: $2.0 < DT51/DT11 < 3.5$.

In one embodiment, an edge thickness ET5 of the fifth lens and a center thickness CT5 of the fifth lens along the optical axis may satisfy: $1.0 < ET5/CT5 < 2.0$.

In one embodiment, a distance TTL along the optical axis from the object-side surface of the first lens to an image plane of the optical imaging lens assembly and a sum of edge thicknesses $\Sigma ET$ of the first lens to the fifth lens may satisfy: $0.5 < TTL/\Sigma ET < 2.5$.

In one embodiment, a total effective focal length f of the optical imaging lens assembly and an entrance pupil diameter EPD of the optical imaging lens assembly may satisfy: $f/EPD < 2.5$.

In one embodiment, a total effective focal length f of the optical imaging lens assembly and half of a diagonal length ImgH of an effective pixel area on an image plane of the optical imaging lens assembly may satisfy: $0.9 < f/ImgH < 1.6$.

In one embodiment, a spaced interval T34 between the third lens and the fourth lens along the optical axis and a center thickness CT3 of the third lens along the optical axis may satisfy: $0.8 < T34/CT3 < 1.5$.

Another aspect of the present disclosure is to provide an optical imaging lens assembly which includes, sequentially along an optical axis from an object side to an image side: a stop, a first lens having positive refractive power or negative refractive power, an image-side surface of the first lens is convex; a second lens having positive refractive power or negative refractive power; a third lens having positive refractive power, an image-side surface of the third lens is concave; a fourth lens having positive refractive power or negative refractive power, an image-side surface of the fourth lens is convex; and a fifth lens having positive refractive power or negative refractive power. An effective focal length f2 of the second lens and an effective focal length f3 of the third lens may satisfy: $1.0 < |f3/f2| < 5.0$. A distance SAG41 along the optical axis from an intersection of an object-side surface of the fourth lens and the optical axis to a vertex of an effective radius of the object-side surface of the fourth lens and a distance SAG12 along the optical axis from an intersection of the image-side surface of the first lens and the optical axis to a vertex of an effective radius of the image-side surface of the first lens may satisfy: 0.5<SAG12/SAG41<4.0. At least one of an object-side surface of the first lens to an image-side surface of the fifth lens is aspheric.

In one embodiment, a total effective focal length f of the optical imaging lens assembly and a radius of curvature R8 of the image-side surface of the fourth lens may satisfy: −4.0<f/R8<−1.0.

In one embodiment, a combined focal length f45 of the fourth lens and the fifth lens and a total effective focal length f of the optical imaging lens assembly may satisfy: 1.5≤f45/f≤2.5.

In one embodiment, a total effective focal length f of the optical imaging lens assembly, a radius of curvature R2 of the image-side surface of the first lens and a radius of curvature R5 of an object-side surface of the third lens may satisfy: 0<|f/R2+f/R5|<1.5.

In one embodiment, a radius of curvature R4 of an image-side surface of the second lens, a radius of curvature R9 of an object-side surface of the fifth lens and a total effective focal length f of the optical imaging lens assembly may satisfy: 1.5<|f/R4+f/R9|<4.0.

In one embodiment, a maximum effective radius DT32 of the image-side surface of the third lens and half of a diagonal length ImgH of an effective pixel area on an image plane of the optical imaging lens assembly may satisfy: 1.0<ImgH/DT32<2.5.

In one embodiment, a maximum effective radius DT51 of an object-side surface of the fifth lens and a maximum effective radius DT11 of the object-side surface of the first lens may satisfy: 2.0<DT51/DT11<3.5.

In one embodiment, an edge thickness ET5 of the fifth lens and a center thickness CT5 of the fifth lens along the optical axis may satisfy: 1.0<ET5/CT5<2.0.

In one embodiment, a distance TTL along the optical axis from the object-side surface of the first lens to an image plane of the optical imaging lens assembly and a sum of edge thicknesses ΣET of the first lens to the fifth lens may satisfy: 0.5<TTL/ΣET<2.5.

In one embodiment, a total effective focal length f of the optical imaging lens assembly and an entrance pupil diameter EPD of the optical imaging lens assembly may satisfy: f/EPD<2.5.

In one embodiment, a total effective focal length f of the optical imaging lens assembly and half of a diagonal length ImgH of an effective pixel area on an image plane of the optical imaging lens assembly may satisfy: 0.9<f/ImgH<1.6.

In one embodiment, a spaced interval T34 between the third lens and the fourth lens along the optical axis and a center thickness CT3 of the third lens along the optical axis may satisfy: 0.8<T34/CT3<1.5.

The embodiments of the present disclosure provide an optical imaging lens assembly applicable to the portable electronic products, and having at least one beneficial effect such as small wide-angle, large aperture, low sensitivity, miniaturization and good image quality by reasonably distributing the refractive powers and optimizing optical parameters.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

Figure 1:
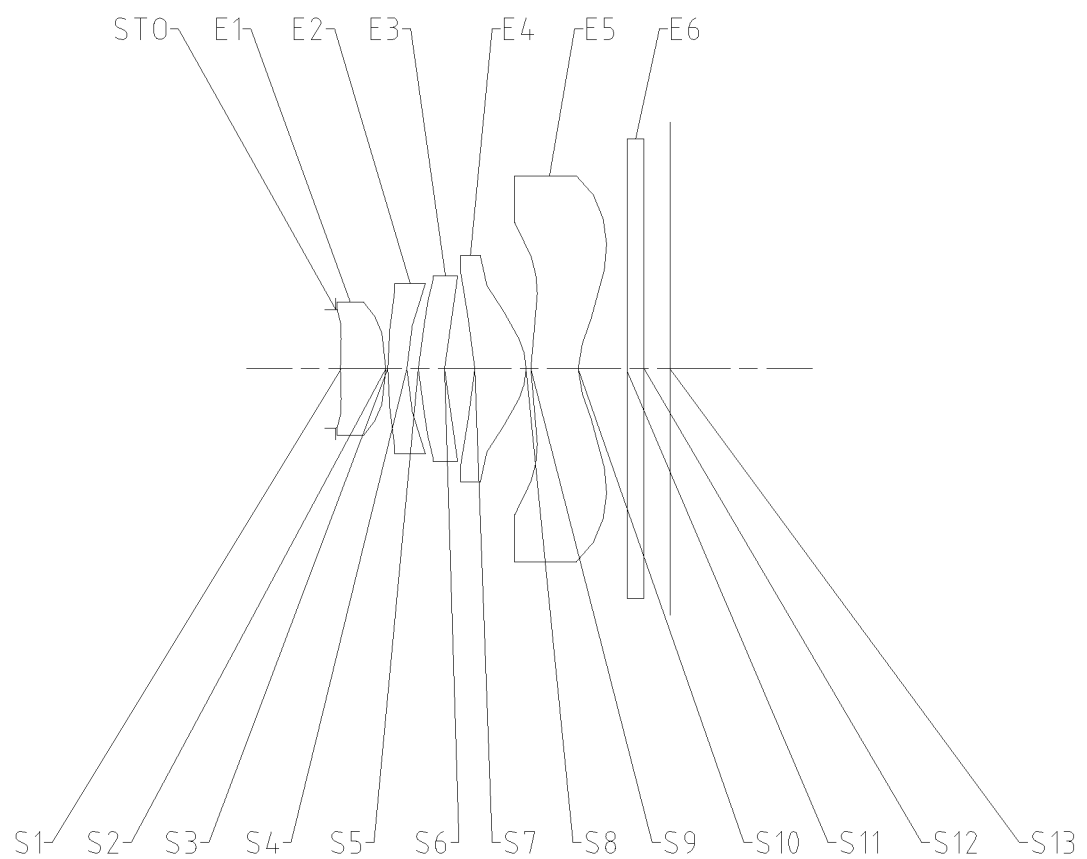
FIG. 1 illustrates a schematic structural diagram of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial area; and if a surface of a lens is concave and the position of the concave is not defined, it indicates that the surface of the lens is concave at least in the paraxial area. In each lens, the surface closest to the object is referred to as an object-side surface of the lens, and the surface closest to the image plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure". Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include five lenses having refractive power, which are a first lens, a second lens, a third lens, a fourth lens and a fifth lens. The five lenses are arranged sequentially from an object side to an image side along an optical axis. Among the first lens to the fifth lens, there may be a spaced interval between each two adjacent lenses.

In an exemplary embodiment, the first lens may have positive or negative refractive power, and an image-side surface of the first lens may be convex; the second lens may have positive or negative refractive power; the third lens may have positive refractive power, and an image-side surface of the third lens may be concave; the fourth lens may have positive or negative refractive power, and an image-side surface of the fourth lens may be convex; and the fifth lens may have positive or negative refractive power.

In an exemplary embodiment, the optical imaging lens assembly according to the present disclosure may satisfy: $1.0<|f3/f2|<5.0$, where f2 is an effective focal length of the second lens, and f3 is an effective focal length of the third lens. More specifically, f3 and f2 may further satisfy: $1.4<|f3/f2|<4.9$. Satisfying $1.0<|f3/f2|<5.0$ may control the spherical aberration contribution of the optical imaging lens assembly within a reasonable range, so that the on-axis field-of-view has good image quality.

In an exemplary embodiment, the optical imaging lens assembly according to the present disclosure may satisfy: $-4.0<f/R8<-1.0$, where f is a total effective focal length of the optical imaging lens assembly, and R8 is a radius of curvature of the image-side surface of the fourth lens. More specifically, f and R8 may further satisfy: $-3.8<f/R8<-1.1$. Satisfying $-4.0<f/R8<-1.0$ is beneficial to controlling the deflection angle of light, so that the lens assembly may be more easily matched with commonly used chips.

In an exemplary embodiment, the optical imaging lens assembly according to the present disclosure may satisfy: $1.5 \leq f45/f \leq 2.5$, where f45 is a combined focal length of the fourth lens and the fifth lens, and f is a total effective focal length of the optical imaging lens assembly. Satisfying $1.5 \leq f45/f \leq 2.5$ may effectively control the field curvature of the lens assembly, thereby improving the image quality of the lens assembly.

In an exemplary embodiment, the optical imaging lens assembly according to the present disclosure may satisfy: $0<|f/R2+f/R5|<1.5$, where f is a total effective focal length of the optical imaging lens assembly, R2 is a radius of curvature of the image-side surface of the first lens, and R5 is a radius of curvature of an object-side surface of the third lens. More specifically, f, R2 and R5 may further satisfy: $0.1<|f/R2+f/R5|<1.2$. Satisfying $0<|f/R2+f/R5|<1.5$ is beneficial to improving the spherical aberration and astigmatic of the optical imaging lens assembly.

In an exemplary embodiment, the optical imaging lens assembly according to the present disclosure may satisfy: $1.5<|f/R4+f/R9|<4.0$, where R4 is a radius of curvature of an image-side surface of the second lens, R9 is a radius of curvature of an object-side surface of the fifth lens, and f a total effective focal length of the optical imaging lens assembly. More specifically, f, R4 and R9 may further satisfy: $1.7<|f/R4+f/R9|<4.0$. Satisfying $1.5<|f/R4+f/R9|<4.0$ may make the optical imaging lens assembly have a better ability to balance astigmatic.

In an exemplary embodiment, the optical imaging lens assembly according to the present disclosure may satisfy: $0.5<SAG12/SAG41<4.0$, where SAG41 is a distance along the optical axis from an intersection of an object-side surface of the fourth lens and the optical axis to a vertex of an effective radius of the object-side surface of the fourth lens, and SAG12 is a distance along the optical axis from an intersection of the image-side surface of the first lens and the optical axis to a vertex of an effective radius of the image-side surface of the first lens. More specifically, SAG12 and SAG41 may further satisfy: $0.8<SAG12/SAG41<3.9$. Satisfying $0.5<SAG12/SAG41<4.0$ is beneficial to uniformly distributing the lens sizes of the first lens and the fourth lens, and is beneficial to reducing the difficulty of lens processing and assembly.

In an exemplary embodiment, the optical imaging lens assembly according to the present disclosure may satisfy:

$1.0<ImgH/DT32<2.5$, where DT32 is a maximum effective radius of the image-side surface of the third lens, and ImgH is half of a diagonal length of an effective pixel area on an image plane of the optical imaging lens assembly. More specifically, ImgH and DT32 may further satisfy: $1.5<ImgH/DT32<2.5$. Satisfying $1.0<ImgH/DT32<2.5$ may effectively reduce the total size of the optical imaging lens assembly, which is beneficial to achieving the miniaturization of the imaging lens assembly.

In an exemplary embodiment, the optical imaging lens assembly according to the present disclosure may satisfy: $2.0<DT51/DT11<3.5$, where DT51 is a maximum effective radius of an object-side surface of the fifth lens, and DT11 is a maximum effective radius of an object-side surface of the first lens. More specifically, DT51 and DT11 may further satisfy: $2.1<DT51/DT11<2.8$. Satisfying $2.0<DT51/DT11<3.5$ may effectively eliminate the spherical aberration of the optical imaging lens assembly, which is beneficial to obtaining high-definition images.

In an exemplary embodiment, the optical imaging lens assembly according to the present disclosure may satisfy: $2.0<CT4\ \Sigma ET4<4.0$, where CT4 is a center thickness of the fourth lens along the optical axis, and ET4 is an edge thickness of the fourth lens. More specifically, CT4 and ET4 may further satisfy: $2.2<CT4\ \Sigma ET4<3.7$. Satisfying $2.0<CT4\ \Sigma ET4<4.0$ may ensure the compact structure of the optical imaging lens assembly, and at the same time make the lens assembly meet the requirements of workability and manufacturability.

In an exemplary embodiment, the optical imaging lens assembly according to the present disclosure may satisfy: $1.0<ET5/CT5<2.0$, where ET5 is an edge thickness of the fifth lens, and CT5 is a center thickness of the fifth lens along the optical axis. Satisfying $1.0<ET5/CT5<2.0$ is beneficial to uniformly distributing the lens size of the fifth lens, and is beneficial to reducing the difficulty of lens processing and assembly.

In an exemplary embodiment, the optical imaging lens assembly according to the present disclosure may satisfy: $0.5<TTL/\Sigma ET<2.5$, where TTL is a distance along the optical axis from an object-side surface of the first lens to an image plane of the optical imaging lens assembly, and $\Sigma ET$ is a sum of the edge thicknesses of the first lens to the fifth lens. More specifically, TTL and $\Sigma ET$ may further satisfy: $1.8<TTL/\Sigma ET<2.2$. Satisfying $0.5<TTL/\Sigma ET<2.5$ is beneficial to uniformly distributing the lens sizes of the first lens to the fifth lens, so as to ensure the assembly stability of the lens assembly, and is beneficial to reducing the overall aberration of the optical imaging lens assembly.

In an exemplary embodiment, the optical imaging lens assembly according to the present disclosure may satisfy: $f/EPD<2.5$, where f is a total effective focal length of the optical imaging lens assembly, and EPD is an entrance pupil diameter of the optical imaging lens assembly. More specifically, f and EPD may further satisfy: $f/EPD<2.4$. Satisfying $f/EPD<2.5$ may make the lens assembly have the advantages of large diaphragm and large aperture in the process of increasing the light flux of the lens assembly, which is beneficial to reducing the marginal field of view aberration and enhancing the imaging effect in the dark environment, so that the lens assembly has a lower sensitivity.

In an exemplary embodiment, the optical imaging lens assembly according to the present disclosure may satisfy: $0.9<f/ImgH<1.6$, where f is a total effective focal length of the optical imaging lens assembly, and ImgH is half of a diagonal length of an effective pixel area on an image plane of the optical imaging lens assembly.

In an exemplary embodiment, the optical imaging lens assembly according to the present disclosure may satisfy: $0.8<T34/CT3<1.5$, where T34 is a spaced interval between the third lens and the fourth lens along the optical axis, and CT3 is a center thickness of the third lens along the optical axis.

In an exemplary embodiment, the optical imaging lens assembly according to the present disclosure may further include a stop disposed between the object side and the first lens. Optionally, the above optical imaging lens assembly may further include an optical filter for correcting the color deviation and/or a protective glass for protecting the photosensitive element located on an image plane. The present disclosure proposes an optical imaging lens assembly with features such as small wide angle, large aperture, low sensitivity, miniaturization, and high image quality. The optical imaging lens assembly according to the above embodiments of the present disclosure may employ a plurality of lenses, such as five lenses as described above. By reasonably distributing the refractive power of each lens, the surface type, the center thickness of each lens, and spaced intervals along the optical axis between the lenses, the incident light may be effectively converged, the total optical length of the imaging lens assembly may be reduced, and the workability of the imaging lens assembly may be improved, such that the optical imaging lens assembly is more advantageous for production processing.

In the embodiments of the present disclosure, at least one of the surfaces of lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

However, it should be understood by those skilled in the art that the number of lenses constituting the optical imaging lens assembly may be varied to achieve the various results and advantages described in this specification without departing from the technical solution claimed by the present disclosure. For example, although the embodiment is described by taking five lenses as an example, the optical imaging lens assembly is not limited to having the five lenses. The optical imaging lens assembly may also include other numbers of lenses if desired.

Specific examples of an optical imaging lens assembly applicable to the above embodiment are further described below with reference to the accompanying drawings.

Example 1

An optical imaging lens assembly according to example 1 of the present disclosure is described below with reference to FIG. 1 to FIG. 2D. FIG. 1 illustrates a schematic structural diagram of the optical imaging lens assembly according to example 1 of the present disclosure.

As shown in FIG. 1, the optical imaging lens assembly includes, sequentially along an optical axis from an object side to an image side, a stop STO, a first lens E1, a second lens E2, a third lens E3, a fourth lens E4, a fifth lens E5, an optical filter E6 and an image plane S13.

The first lens E1 has positive refractive power, an object-side surface S1 thereof is convex, and an image-side surface S2 thereof is convex. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and finally forms an image on the image plane S13.

Table 1 is a table showing basic parameters of the optical imaging lens assembly of example 1. Here, the units of the radius of curvature, the thickness/distance and the focal length are millimeter (mm).

In this example, a total effective focal length f of the optical imaging lens assembly is 2.65 mm, a total track length TTL of the optical imaging lens assembly (that is, a distance along the optical axis from the object-side surface S1 of the first lens E1 to the image plane S13 of the optical imaging lens assembly) is 4.06 mm, half of a diagonal length ImgH of an effective pixel area on the image plane S13 of the optical imaging lens assembly is 1.87 mm, and half of a maximum field-of-view Semi-FOV of the optical imaging lens assembly is 35.2°.

In example 1, the object-side surface and the image-side surface of any one of the first lens E1 to the fifth lens E5 are aspheric. The surface type x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2-1 and Table 2-2 below show high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$, and $A_{30}$ applicable to each aspheric surface S1 to S10 in example 1.

TABLE 1

| Surface number | Surface type | Radius of curvature | Thickness/ Distance | Material Refractive index | Abbe number | Focal length | Conic coefficient |
|---|---|---|---|---|---|---|---|
| OBJ | | Infinite | 350.0000 | | | | |
| STO | | Infinite | 0.0611 | | | | |
| S1 | Aspheric | 5.6005 | 0.5586 | 1.55 | 56.1 | 3.24 | 55.0934 |
| S2 | Aspheric | −2.4951 | 0.0250 | | | | 1.6380 |
| S3 | Aspheric | 5.5170 | 0.2350 | 1.67 | 20.4 | −5.91 | 2.1460 |
| S4 | Aspheric | 2.2593 | 0.1395 | | | | −3.2316 |
| S5 | Aspheric | 1.4269 | 0.3237 | 1.55 | 56.1 | 12.59 | −19.0647 |
| S6 | Aspheric | 1.6565 | 0.3756 | | | | −5.9890 |
| S7 | Aspheric | −1.8166 | 0.6301 | 1.67 | 56.1 | 1.98 | −1.5515 |
| S8 | Aspheric | −0.7608 | 0.0581 | | | | −2.3599 |
| S9 | Aspheric | 2.1642 | 0.5850 | 1.64 | 23.5 | −2.20 | −39.8677 |
| S10 | Aspheric | 0.7654 | 0.6033 | | | | −6.2038 |
| S11 | | Infinite | 0.2100 | 1.51 | 64.2 | | |
| S12 | | Infinite | 0.3161 | | | | |
| S13 | | Infinite | | | | | |

TABLE 2-1

| Surface number | $A_4$ | $A_6$ | $A_8$ | $A_{10}$ | $A_{12}$ | $A_{14}$ | $A_{16}$ |
|---|---|---|---|---|---|---|---|
| S1 | −8.2825E−02 | −8.5467E−03 | −1.4819E−03 | −3.6552E−04 | −1.3842E−04 | −4.4301E−05 | −2.8770E−05 |
| S2 | −1.0487E−01 | −4.3207E−04 | 5.3100E−04 | −9.0310E−05 | 3.2068E−04 | −1.3470E−04 | 4.3639E−05 |
| S3 | −2.1357E−03 | −9.2556E−04 | 2.6639E−03 | −2.3494E−03 | 4.0281E−04 | −2.3484E−04 | 6.8740E−05 |
| S4 | 2.6047E−02 | −1.1521E−02 | 7.5183E−04 | −8.3690E−04 | −8.5928E−04 | 8.5897E−05 | −1.2355E−04 |
| S5 | −3.0285E−02 | 2.8777E−03 | 1.2199E−02 | 4.5747E−04 | −3.2617E−04 | −1.0648E−03 | −5.9592E−06 |
| S6 | −1.4822E−01 | 5.4123E−05 | 5.1581E−03 | 6.4725E−03 | 2.9526E−03 | 8.3627E−04 | 1.0230E−04 |
| S7 | 2.2498E−01 | −2.1999E−02 | −6.1440E−03 | −2.0568E−03 | 6.1488E−04 | 1.8584E−04 | −2.6743E−04 |
| S8 | 1.6153E−01 | 7.3455E−02 | −2.5875E−02 | −1.7088E−02 | 1.2859E−03 | 5.0713E−03 | −3.4607E−04 |
| S9 | −4.3910E−01 | 5.3593E−03 | 1.6950E−02 | −8.1252E−03 | 2.6685E−03 | 8.7321E−04 | 1.3514E−03 |
| S10 | −9.1738E−01 | 4.4358E−02 | −2.2744E−02 | −3.4783E−03 | −3.2383E−04 | −9.3668E−04 | 2.2517E−03 |

TABLE 2-2

| Surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −1.5025E−05 | −1.6310E−05 | 0.0000E+00 | 0.0000E+00 | 0.0000E+00 | 0.0000E+00 | 0.0000E+00 |
| S2 | −2.5295E−05 | 1.2761E−05 | 0.0000E+00 | 0.0000E+00 | 0.0000E+00 | 0.0000E+00 | 0.0000E+00 |
| S3 | −9.6456E−07 | 2.5501E−05 | 0.0000E+00 | 0.0000E+00 | 0.0000E+00 | 0.0000E+00 | 0.0000E+00 |
| S4 | 8.7898E−05 | −1.2698E−06 | 0.0000E+00 | 0.0000E+00 | 0.0000E+00 | 0.0000E+00 | 0.0000E+00 |
| S5 | 3.6122E−05 | 9.3345E−05 | 0.0000E+00 | 0.0000E+00 | 0.0000E+00 | 0.0000E+00 | 0.0000E+00 |
| S6 | −3.6553E−05 | −1.2475E−05 | 0.0000E+00 | 0.0000E+00 | 0.0000E+00 | 0.0000E+00 | 0.0000E+00 |
| S7 | 1.1861E−04 | 1.1910E−04 | 1.3393E−04 | 1.8501E−05 | 4.0777E−06 | 0.0000E+00 | 0.0000E+00 |
| S8 | −7.4270E−04 | −5.7130E−04 | 2.8857E−04 | 5.6647E−05 | −4.4785E−05 | 0.0000E+00 | 0.0000E+00 |
| S9 | 4.9278E−04 | −5.6545E−04 | −3.6922E−05 | −4.7141E−04 | 8.4384E−05 | −1.4410E−05 | 1.4655E−04 |
| S10 | 1.1037E−04 | 1.1453E−03 | 1.6983E−04 | 2.6380E−04 | −1.5019E−05 | 2.2492E−05 | −4.6389E−05 |

Figure 2A:
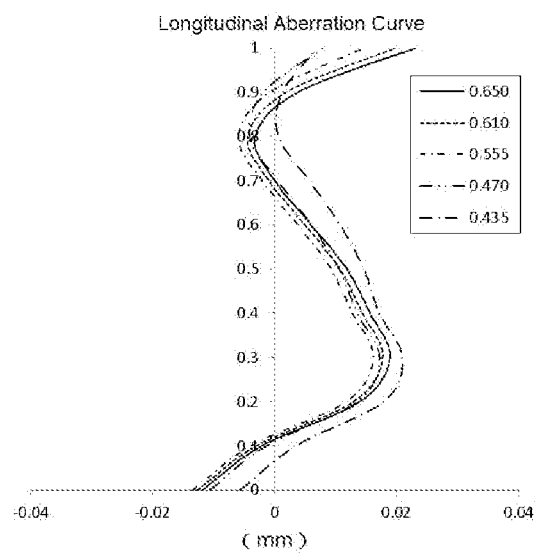
FIGS. 2A to 2D illustrate a longitudinal aberration curve, an astigmatic curve, a distortion curve, and a lateral color curve of the optical imaging lens assembly of the example 1, respectively.
Figure 2B:
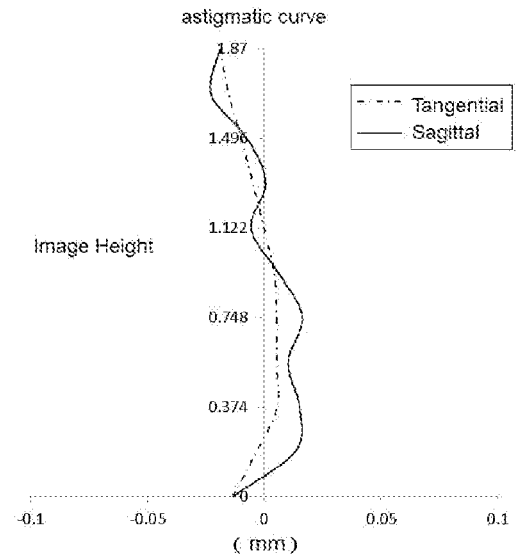
Figure 2C:
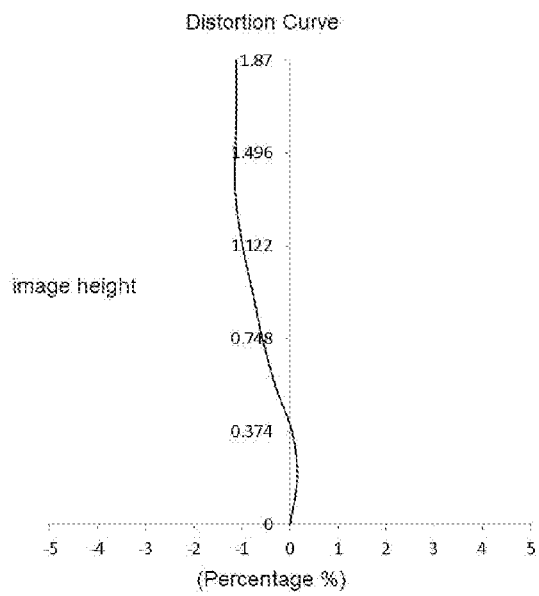
Figure 2D:
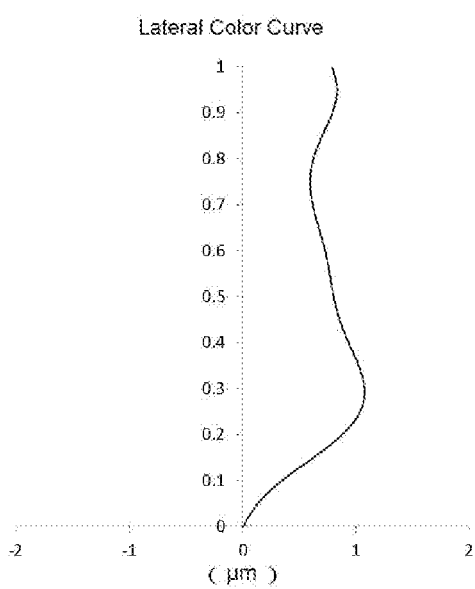

FIG. 2A illustrates a longitudinal aberration curve of the optical imaging lens assembly according to example 1, representing the deviations of focal points converged by light of different wavelengths after passing through the lens assembly. FIG. 2B illustrates an astigmatic curve of the optical imaging lens assembly according to example 1, representing the curvature of a tangential plane and the curvature of a sagittal plane. FIG. 2C illustrates a distortion curve of the optical imaging lens assembly according to example 1, representing the amounts of distortion corresponding to different image heights. FIG. 2D illustrates a lateral color curve of the optical imaging lens assembly according to example 1, representing the deviations of different image heights on an image plane after light passes through the lens assembly. It can be seen from FIG. 2A to FIG. 2D that the optical imaging lens assembly provided in example 1 can achieve good image quality.

Example 2

Figure 3:
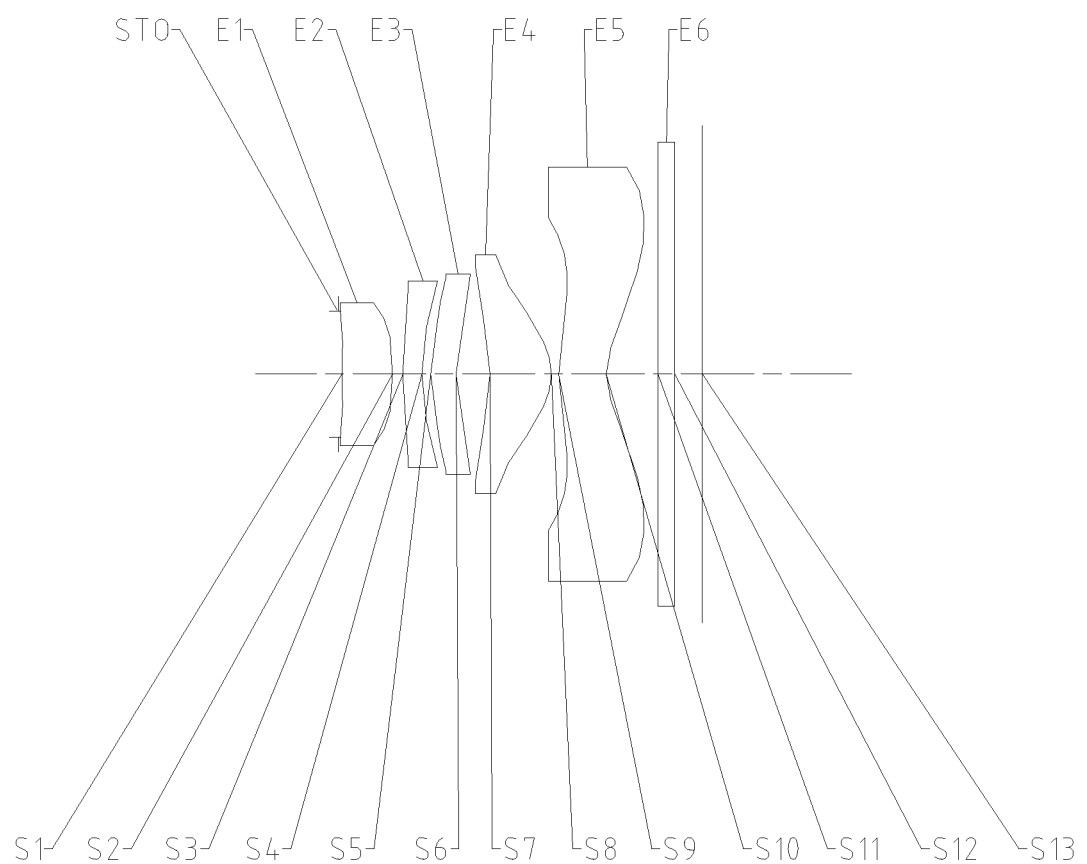
FIG. 3 illustrates a schematic structural diagram of an optical imaging lens assembly according to example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 illustrates a schematic structural diagram of the optical imaging lens assembly according to example 2 of the present disclosure.

As shown in FIG. 3, the optical imaging lens assembly includes, sequentially along an optical axis from an object side to an image side, a stop STO, a first lens E1, a second lens E2, a third lens E3, a fourth lens E4, a fifth lens E5, an optical filter E6 and an image plane S13.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and finally forms an image on the image plane S13.

In this example, a total effective focal length f of the optical imaging lens assembly is 2.83 mm, a total track length TTL of the optical imaging lens assembly is 4.45 mm, half of a diagonal length ImgH of an effective pixel area on the image plane S13 of the optical imaging lens assembly is 1.95 mm, and half of a maximum field-of-view Semi-FOV of the optical imaging lens assembly is 34.5°.

Table 3 is a table showing basic parameters of the optical imaging lens assembly of example 2. Here, the units of the radius of curvature, the thickness/distance and the focal length are millimeter (mm). Table 4-1 and Table 4-2 show high-order coefficients applicable to each aspheric surface in example 2. Here, the surface type of each aspheric surface may be defined by the formula (1) given in the above example 1.

TABLE 3

| Surface number | Surface type | Radius of curvature | Thickness/ Distance | Material Refractive index | Material Abbe number | Focal length | Conic coefficient |
|---|---|---|---|---|---|---|---|
| OBJ |  | Infinite | 350.0000 |  |  |  |  |
| STO |  | Infinite | 0.0446 |  |  |  |  |
| S1 | Aspheric | 5.9704 | 0.6257 | 1.55 | 56.1 | 5.79 | 54.7951 |
| S2 | Aspheric | −6.4757 | 0.1250 |  |  |  | 17.4591 |
| S3 | Aspheric | 3.5000 | 0.2350 | 1.67 | 20.4 | 66.10 | −39.0293 |
| S4 | Aspheric | 3.7000 | 0.1094 |  |  |  | 0.4051 |
| S5 | Aspheric | 1.8100 | 0.3129 | 1.55 | 56.1 | 96.49 | −17.2640 |
| S6 | Aspheric | 1.7600 | 0.4202 |  |  |  | −5.6650 |
| S7 | Aspheric | −2.2457 | 0.7567 | 1.67 | 56.1 | 1.82 | −0.9586 |
| S8 | Aspheric | −0.7710 | 0.0910 |  |  |  | −2.4030 |
| S9 | Aspheric | 2.6255 | 0.5850 | 1.64 | 23.5 | −1.97 | −38.3572 |
| S10 | Aspheric | 0.7800 | 0.6381 |  |  |  | −4.9844 |
| S11 |  | Infinite | 0.2100 | 1.51 | 64.2 |  |  |
| S12 |  | Infinite | 0.3379 |  |  |  |  |
| S13 |  | Infinite |  |  |  |  |  |

TABLE 4-1

| Surface number | $A_4$ | $A_6$ | $A_8$ | $A_{10}$ | $A_{12}$ | $A_{14}$ | $A_{16}$ |
|---|---|---|---|---|---|---|---|
| S1 | −7.3509E−02 | −6.9032E−03 | −1.2337E−03 | −3.3118E−04 | −1.3808E−04 | −4.1173E−05 | −1.9281E−05 |
| S2 | −1.4151E−01 | 7.0810E−03 | −1.1245E−04 | −4.9276E−04 | 1.8429E−04 | −6.9941E−05 | 1.8052E−05 |
| S3 | −3.3162E−02 | 2.8578E−03 | 3.6649E−03 | −3.1807E−03 | 7.5719E−04 | −3.0662E−04 | 4.9433E−05 |
| S4 | 4.2057E−02 | −2.3517E−02 | 4.8675E−03 | −4.1482E−03 | 2.6880E−04 | −6.7077E−04 | 9.2134E−05 |
| S5 | −4.0718E−02 | 3.5207E−03 | 1.4442E−02 | −3.5177E−05 | −6.5392E−04 | −1.4827E−03 | 5.7877E−05 |
| S6 | −1.6305E−01 | 6.9676E−04 | 6.0213E−03 | 5.7107E−03 | 2.6526E−03 | 6.8858E−04 | 6.8434E−05 |
| S7 | 2.2324E−01 | −2.5467E−02 | −7.6523E−03 | −1.4209E−03 | −5.0534E−04 | 2.5143E−04 | −9.2688E−05 |
| S8 | 8.9515E−02 | 4.8124E−02 | −1.1153E−02 | −1.0470E−02 | −3.2885E−03 | 2.0880E−03 | 9.9789E−04 |
| S9 | −3.5439E−01 | −3.1294E−02 | 1.9247E−02 | −5.0851E−03 | −1.5165E−03 | 2.4198E−03 | 1.2946E−04 |
| S10 | −9.2114E−01 | 7.1507E−02 | −3.5971E−02 | 1.0951E−02 | −6.7334E−03 | 6.9751E−03 | −1.8417E−03 |

TABLE 4-2

| Surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −4.4490E−06 | −5.6542E−06 | 0.0000E+00 | 0.0000E+00 | 0.0000E+00 | 0.0000E+00 | 0.0000E+00 |
| S2 | −7.7338E−06 | 5.3962E−06 | 0.0000E+00 | 0.0000E+00 | 0.0000E+00 | 0.0000E+00 | 0.0000E+00 |
| S3 | −2.4156E−05 | 1.2403E−05 | 0.0000E+00 | 0.0000E+00 | 0.0000E+00 | 0.0000E+00 | 0.0000E+00 |
| S4 | −1.0104E−05 | 4.0134E−05 | 0.0000E+00 | 0.0000E+00 | 0.0000E+00 | 0.0000E+00 | 0.0000E+00 |
| S5 | 1.2794E−04 | 9.9509E−05 | 0.0000E+00 | 0.0000E+00 | 0.0000E+00 | 0.0000E+00 | 0.0000E+00 |
| S6 | 1.9383E−05 | 9.3983E−06 | 0.0000E+00 | 0.0000E+00 | 0.0000E+00 | 0.0000E+00 | 0.0000E+00 |
| S7 | 1.8586E−05 | 1.4729E−04 | 1.2586E−04 | 5.7775E−05 | 3.2903E−05 | 0.0000E+00 | 0.0000E+00 |
| S8 | 1.5560E−04 | −1.1352E−04 | 7.9803E−05 | 6.2227E−05 | −2.0263E−05 | 0.0000E+00 | 0.0000E+00 |
| S9 | 9.5789E−04 | −1.1074E−04 | 2.1148E−04 | −2.2182E−04 | −6.2683E−05 | −6.2821E−05 | 1.6940E−05 |
| S10 | 2.9443E−03 | −5.7708E−04 | 8.7072E−04 | −3.4972E−04 | 3.6472E−04 | −4.1916E−05 | 1.3140E−04 |

Figure 4A:
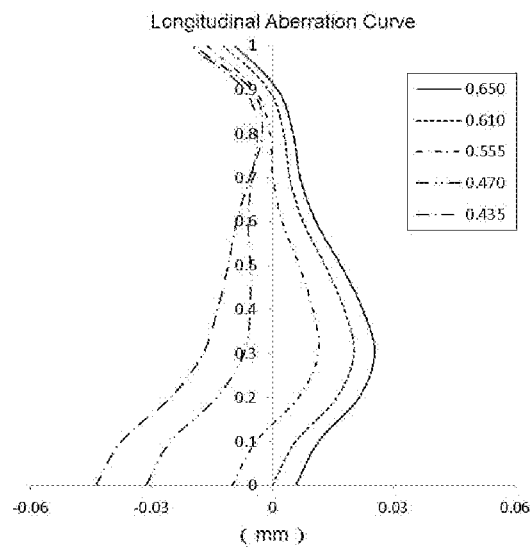
FIGS. 4A to 4D illustrate a longitudinal aberration curve, an astigmatic curve, a distortion curve, and a lateral color curve of the optical imaging lens assembly of the example 2, respectively.
Figure 4B:
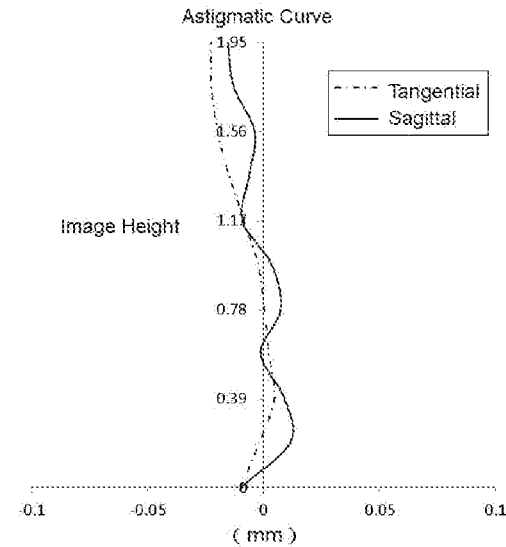
Figure 4C:
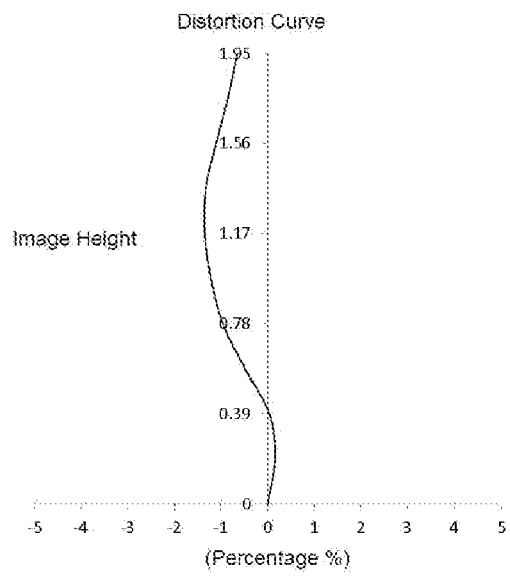
Figure 4D:
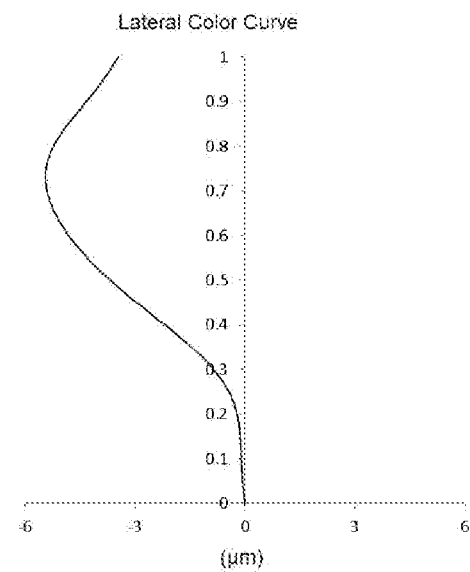

FIG. 4A illustrates a longitudinal aberration curve of the optical imaging lens assembly according to example 2, representing the deviations of focal points converged by light of different wavelengths after passing through the lens assembly. FIG. 4B illustrates an astigmatic curve of the optical imaging lens assembly according to example 2, representing the curvature of a tangential plane and the curvature of a sagittal plane. FIG. 4C illustrates a distortion curve of the optical imaging lens assembly according to example 2, representing the amounts of distortion corresponding to different image heights. FIG. 4D illustrates a lateral color curve of the optical imaging lens assembly according to example 2, representing the deviations of different image heights on an image plane after light passes through the lens assembly. It can be seen from FIG. 4A to FIG. 4D that the optical imaging lens assembly provided in example 2 can achieve good image quality.

Example 3

Figure 5:
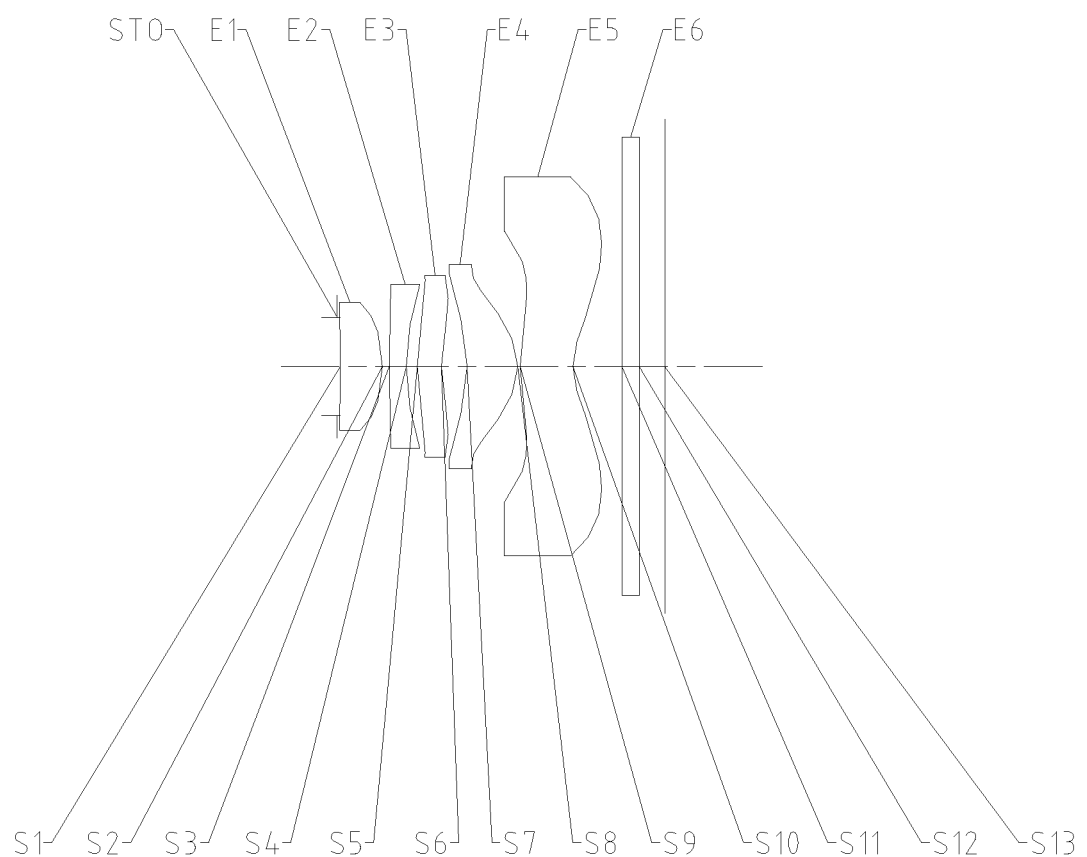
FIG. 5 illustrates a schematic structural diagram of an optical imaging lens assembly according to example 3 of the present disclosure.

An optical imaging lens assembly according to example 3 of the present disclosure is described below with reference to FIG. 5 to FIG. 6D. FIG. 5 illustrates a schematic structural diagram of the optical imaging lens assembly according to example 3 of the present disclosure.

As shown in FIG. 5, the optical imaging lens assembly includes, sequentially along an optical axis from an object side to an image side, a stop STO, a first lens E1, a second lens E2, a third lens E3, a fourth lens E4, a fifth lens E5, an optical filter E6 and an image plane S13.

The first lens E1 has positive refractive power, an object-side surface S1 thereof is convex, and an image-side surface S2 thereof is convex. The second lens E2 has negative refractive power, an object-side surface S3 thereof is concave, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and finally forms an image on the image plane S13.

In this example, a total effective focal length f of the optical imaging lens assembly is 2.58 mm, a total track length TTL of the optical imaging lens assembly is 4.00 mm, half of a diagonal length ImgH of an effective pixel area on the image plane S13 of the optical imaging lens assembly is 2.44 mm, and half of a maximum field-of-view Semi-FOV of the optical imaging lens assembly is 43.5°.

Table 5 is a table showing basic parameters of the optical imaging lens assembly of example 3. Here, the units of the radius of curvature, the thickness/distance and the focal length are millimeter (mm). Table 6-1 and Table 6-2 show high-order coefficients applicable to each aspheric surface in example 3. Here, the surface type of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ |  | Infinite | 350.0000 |  |  |  |  |
| STO |  | Infinite | 0.0355 |  |  |  |  |
| S1 | Aspheric | 4.9453 | 0.5181 | 1.55 | 56.1 | 2.67 | 36.1177 |
| S2 | Aspheric | −1.9854 | 0.0850 |  |  |  | 0.8194 |
| S3 | Aspheric | −2500.0000 | 0.2100 | 1.67 | 20.4 | −4.30 | −99.0000 |
| S4 | Aspheric | 2.8664 | 0.1358 |  |  |  | −6.2051 |
| S5 | Aspheric | 1.6824 | 0.2975 | 1.55 | 56.1 | 20.68 | −38.1853 |
| S6 | Aspheric | 1.8536 | 0.3176 |  |  |  | −11.5675 |
| S7 | Aspheric | −1.8923 | 0.6229 | 1.67 | 56.1 | 2.06 | −0.7620 |
| S8 | Aspheric | −0.7878 | 0.0299 |  |  |  | −1.9762 |
| S9 | Aspheric | 2.0824 | 0.6500 | 1.64 | 23.5 | −2.50 | −40.7014 |
| S10 | Aspheric | 0.7970 | 0.6060 |  |  |  | −5.1412 |
| S11 |  | Infinite | 0.2100 | 1.51 | 64.2 |  |  |
| S12 |  | Infinite | 0.3173 |  |  |  |  |
| S13 |  | Infinite |  |  |  |  |  |

TABLE 6-1

| Surface number | $A_4$ | $A_6$ | $A_8$ | $A_{10}$ | $A_{12}$ | $A_{14}$ | $A_{16}$ |
|---|---|---|---|---|---|---|---|
| S1 | −4.1841E−02 | −3.0542E−03 | −2.4327E−04 | −3.9120E−05 | −5.1398E−06 | −2.4043E−06 | −2.2409E−06 |
| S2 | −8.3610E−02 | −1.3450E−03 | −9.2654E−04 | −1.8311E−04 | −6.1607E−05 | 1.7190E−05 | 1.3121E−05 |
| S3 | 8.3711E−03 | 6.6198E−03 | −3.9511E−04 | −4.9143E−04 | −1.3020E−04 | 1.1516E−04 | −2.9956E−05 |
| S4 | 6.8052E−03 | 2.0922E−03 | −4.0991E−04 | 5.9045E−04 | −7.7414E−04 | 1.0245E−04 | −1.0731E−04 |
| S5 | −6.3559E−02 | 7.3689E−03 | 1.4090E−02 | −6.1422E−04 | −5.3140E−04 | −9.6317E−04 | 9.9561E−05 |
| S6 | −1.7193E−01 | −4.7808E−03 | 2.8650E−03 | 5.8037E−03 | 1.7723E−03 | 4.3082E−04 | −2.3713E−04 |
| S7 | 1.4840E−01 | −1.7961E−02 | −7.2601E−03 | −5.7991E−05 | 1.6445E−03 | 4.8463E−04 | 8.3428E−05 |
| S8 | 4.1109E−02 | 5.7272E−02 | 2.1481E−03 | −4.3789E−03 | −4.4952E−05 | 1.6961E−03 | 6.4711E−04 |
| S9 | −3.8291E−01 | −2.9804E−02 | 1.5512E−02 | −1.6348E−03 | 6.9938E−03 | 1.2319E−04 | 8.4193E−04 |
| S10 | −9.6487E−01 | 5.9211E−02 | −3.5658E−02 | 5.2947E−03 | −7.8165E−04 | 1.3310E−03 | 7.2080E−04 |

TABLE 6-2

| Surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −9.6752E−07 | 3.4237E−07 | 0.0000E+00 | 0.0000E+00 | 0.0000E+00 | 0.0000E+00 | 0.0000E+00 |
| S2 | 7.1585E−06 | 1.3200E−05 | 0.0000E+00 | 0.0000E+00 | 0.0000E+00 | 0.0000E+00 | 0.0000E+00 |
| S3 | 2.8626E−05 | 1.8429E−06 | 0.0000E+00 | 0.0000E+00 | 0.0000E+00 | 0.0000E+00 | 0.0000E+00 |
| S4 | 4.5489E−05 | 5.6473E−06 | 0.0000E+00 | 0.0000E+00 | 0.0000E+00 | 0.0000E+00 | 0.0000E+00 |
| S5 | 2.4403E−05 | 6.7296E−05 | 0.0000E+00 | 0.0000E+00 | 0.0000E+00 | 0.0000E+00 | 0.0000E+00 |
| S6 | −1.0331E−04 | −5.5636E−05 | 0.0000E+00 | 0.0000E+00 | 0.0000E+00 | 0.0000E+00 | 0.0000E+00 |
| S7 | −3.0488E−05 | 2.3931E−05 | 0.0000E+00 | 0.0000E+00 | 0.0000E+00 | 0.0000E+00 | 0.0000E+00 |

TABLE 6-2-continued

| Surface number | $A_{18}$ | $A_{20}$ | $A_{22}$ | $A_{24}$ | $A_{26}$ | $A_{28}$ | $A_{30}$ |
|---|---|---|---|---|---|---|---|
| S8 | −1.8301E−06 | −1.3911E−04 | −3.9854E−05 | 0.0000E+00 | 0.0000E+00 | 0.0000E+00 | 0.0000E+00 |
| S9 | −6.9003E−04 | −2.2381E−04 | −3.1442E−04 | 2.9812E−05 | 3.0471E−05 | 6.6688E−05 | 0.0000E+00 |
| S10 | 3.3147E−04 | 7.0505E−05 | −1.8710E−05 | 4.6678E−05 | 4.1663E−05 | −3.3728E−05 | 0.0000E+00 |

Figure 6A:
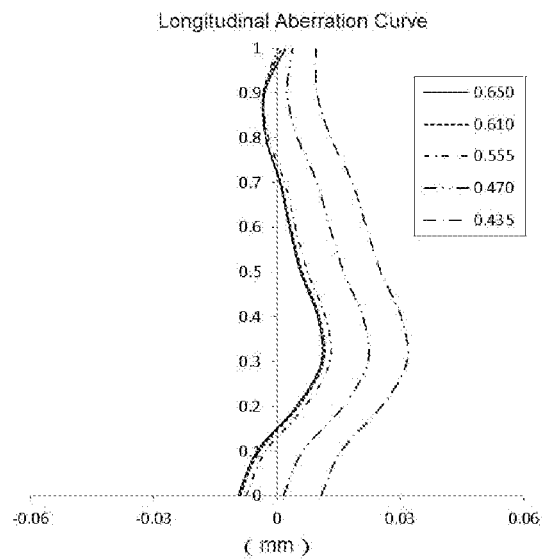
FIGS. 6A to 6D illustrate a longitudinal aberration curve, an astigmatic curve, a distortion curve, and a lateral color curve of the optical imaging lens assembly of the example 3, respectively.
Figure 6B:
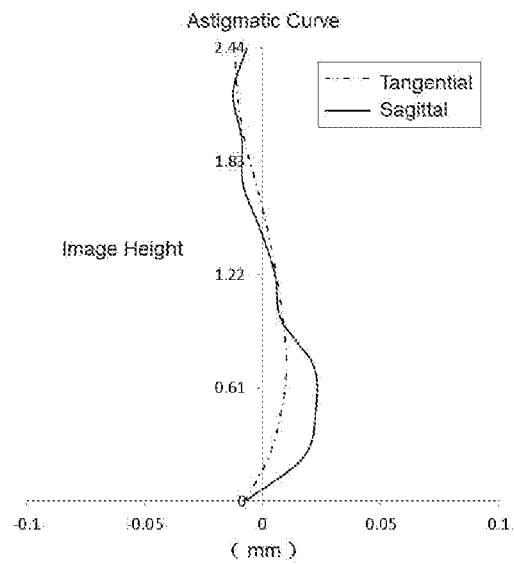
Figure 6C:
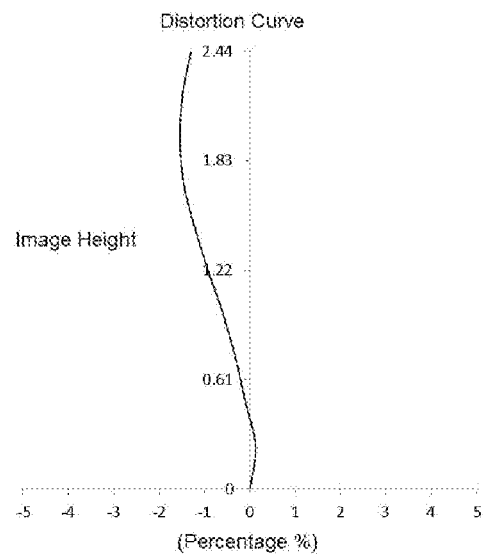
Figure 6D:
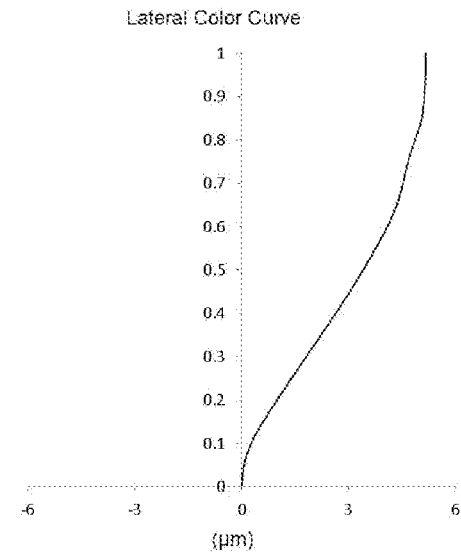

FIG. 6A illustrates a longitudinal aberration curve of the optical imaging lens assembly according to example 3, representing the deviations of focal points converged by light of different wavelengths after passing through the lens assembly. FIG. 6B illustrates an astigmatic curve of the optical imaging lens assembly according to example 3, representing the curvature of a tangential plane and the curvature of a sagittal plane. FIG. 6C illustrates a distortion curve of the optical imaging lens assembly according to example 3, representing the amounts of distortion corresponding to different image heights. FIG. 6D illustrates a lateral color curve of the optical imaging lens assembly according to example 3, representing the deviations of different image heights on an image plane after light passes through the lens assembly. It can be seen from FIG. 6A to FIG. 6D that the optical imaging lens assembly provided in example 3 can achieve good image quality.

Example 4

Figure 7:
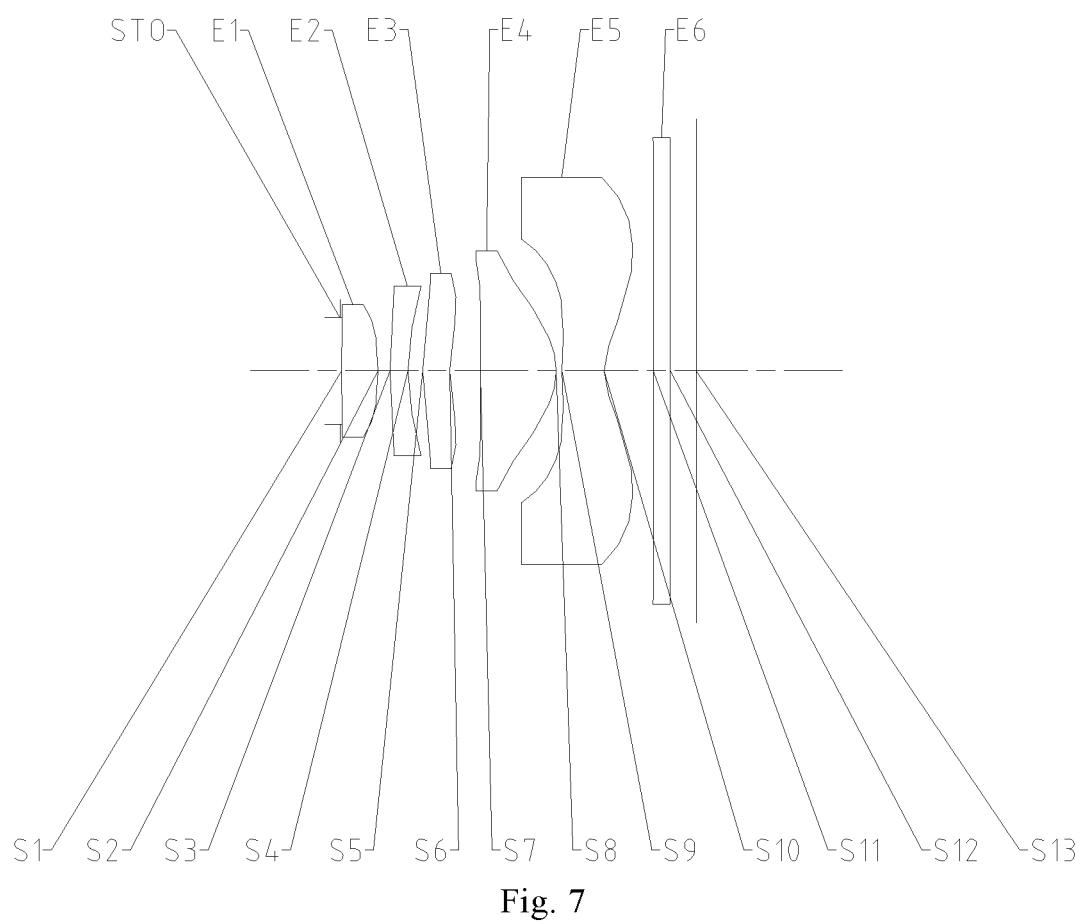
FIG. 7 illustrates a schematic structural diagram of an optical imaging lens assembly according to example 4 of the present disclosure.

An optical imaging lens assembly according to example 4 of the present disclosure is described below with reference to FIG. 7 to FIG. 8D. FIG. 7 illustrates a schematic structural diagram of the optical imaging lens assembly according to example 4 of the present disclosure.

As shown in FIG. 7, the optical imaging lens assembly includes, sequentially along an optical axis from an object side to an image side, a stop STO, a first lens E1, a second lens E2, a third lens E3, a fourth lens E4, a fifth lens E5, an optical filter E6 and an image plane S13.

The first lens E1 has positive refractive power, an object-side surface S1 thereof is convex, and an image-side surface S2 thereof is convex. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and finally forms an image on the image plane S13.

In this example, a total effective focal length f of the optical imaging lens assembly is 2.82 mm, a total track length TTL of the optical imaging lens assembly is 4.36 mm, half of a diagonal length ImgH of an effective pixel area on the image plane S13 of the optical imaging lens assembly is 2.49 mm, and half of a maximum field-of-view Semi-FOV of the optical imaging lens assembly is 41.7°.

Table 7 is a table showing basic parameters of the optical imaging lens assembly of example 4. Here, the units of the radius of curvature, the thickness/distance and the focal length are millimeter (mm). Table 8-1 and Table 8-2 show high-order coefficients applicable to each aspheric surface in example 4. Here, the surface type of each aspheric surface may be defined by the formula (1) given in the above example 1.

TABLE 7

| Surface number | Surface type | Radius of curvature | Thickness/ Distance | Material | | Focal length | Conic coefficient |
| | | | | Refractive index | Abbe number | | |
|---|---|---|---|---|---|---|---|
| OBJ | | Infinite | 350.0000 | | | | |
| STO | | Infinite | 0.0222 | | | | |
| S1 | Aspheric | 5.1179 | 0.4459 | 1.55 | 56.1 | 4.50 | 42.5830 |
| S2 | Aspheric | −4.5860 | 0.1468 | | | | 2.1983 |
| S3 | Aspheric | 4.3996 | 0.2215 | 1.67 | 20.4 | −8.28 | −81.2866 |
| S4 | Aspheric | 2.3980 | 0.1834 | | | | −11.9012 |
| S5 | Aspheric | 1.7000 | 0.3320 | 1.55 | 56.1 | 25.80 | −34.8974 |
| S6 | Aspheric | 1.8000 | 0.3770 | | | | −14.6909 |
| S7 | Aspheric | 21.4839 | 0.9340 | 1.67 | 56.1 | 1.56 | 90.0000 |
| S8 | Aspheric | −0.8714 | 0.0692 | | | | −2.3939 |
| S9 | Aspheric | 3.3457 | 0.5204 | 1.64 | 23.5 | −1.59 | −92.4049 |
| S10 | Aspheric | 0.7362 | 0.6028 | | | | −5.2603 |
| S11 | | Infinite | 0.2100 | 1.51 | 64.2 | | |
| S12 | | Infinite | 0.3191 | | | | |
| S13 | | Infinite | | | | | |

TABLE 8-1

| Surface number | $A_4$ | $A_6$ | $A_8$ | $A_{10}$ | $A_{12}$ | $A_{14}$ | $A_{16}$ |
|---|---|---|---|---|---|---|---|
| S1 | −4.0892E−02 | −3.0388E−03 | −2.8663E−04 | −6.9721E−05 | −1.5160E−05 | −3.5693E−06 | −8.5909E−06 |
| S2 | −9.0280E−02 | −4.5456E−04 | −3.9006E−04 | −1.3333E−04 | −3.6536E−05 | 4.9453E−05 | 3.5077E−05 |
| S3 | −1.9312E−02 | 3.4031E−03 | −3.2057E−04 | −4.4186E−04 | −9.3561E−05 | 1.5118E−04 | −1.5142E−05 |
| S4 | −1.0893E−02 | 5.9123E−03 | −2.0368E−03 | 1.1912E−03 | −5.6424E−04 | 3.1394E−04 | −1.3346E−04 |
| S5 | −8.1250E−02 | 9.8794E−03 | 1.7013E−02 | 9.7812E−04 | −8.6148E−04 | −1.2063E−03 | 1.2526E−04 |
| S6 | −2.2264E−01 | 2.2318E−03 | 6.3903E−03 | 7.6461E−03 | 1.4724E−03 | 2.5729E−04 | −2.3135E−04 |
| S7 | −8.0965E−02 | 4.9824E−03 | −7.3215E−03 | 6.5159E−04 | 8.8175E−04 | 3.0699E−04 | −3.3264E−04 |
| S8 | −2.3317E−04 | 3.4540E−02 | 5.1612E−04 | −5.8700E−03 | −4.7121E−04 | 2.4147E−03 | −1.9002E−04 |
| S9 | −5.9797E−01 | 3.2476E−02 | −1.7624E−02 | −3.0882E−03 | −2.1877E−04 | 2.8487E−03 | −7.4337E−04 |
| S10 | −1.0826E+00 | 9.2294E−02 | −3.2882E−02 | 4.5647E−03 | 3.3115E−03 | −1.8918E−03 | 4.3425E−04 |

TABLE 8-2

| Surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −7.4719E−06 | −1.0280E−05 | 0.0000E+00 | 0.0000E+00 | 0.0000E+00 | 0.0000E+00 | 0.0000E+00 |
| S2 | 2.0739E−05 | 1.8509E−05 | 0.0000E+00 | 0.0000E+00 | 0.0000E+00 | 0.0000E+00 | 0.0000E+00 |
| S3 | 4.2945E−05 | 2.7511E−06 | 0.0000E+00 | 0.0000E+00 | 0.0000E+00 | 0.0000E+00 | 0.0000E+00 |
| S4 | 4.8019E−05 | −1.0908E−05 | 0.0000E+00 | 0.0000E+00 | 0.0000E+00 | 0.0000E+00 | 0.0000E+00 |
| S5 | 7.2031E−05 | 1.0287E−04 | 0.0000E+00 | 0.0000E+00 | 0.0000E+00 | 0.0000E+00 | 0.0000E+00 |
| S6 | −5.3153E−05 | −4.8965E−05 | 0.0000E+00 | 0.0000E+00 | 0.0000E+00 | 0.0000E+00 | 0.0000E+00 |
| S7 | −1.1743E−04 | −2.1185E−05 | 0.0000E+00 | 0.0000E+00 | 0.0000E+00 | 0.0000E+00 | 0.0000E+00 |
| S8 | −3.0509E−05 | −3.3587E−04 | 1.4287E−04 | 0.0000E+00 | 0.0000E+00 | 0.0000E+00 | 0.0000E+00 |
| S9 | 6.9131E−04 | −2.3172E−04 | 2.6233E−04 | −1.1185E−04 | 8.0700E−05 | −2.1367E−05 | 0.0000E+00 |
| S10 | −1.1554E−04 | 4.5413E−04 | −1.0453E−05 | 2.1364E−04 | 3.4999E−05 | −4.2942E−06 | 0.0000E+00 |

Figure 8A:
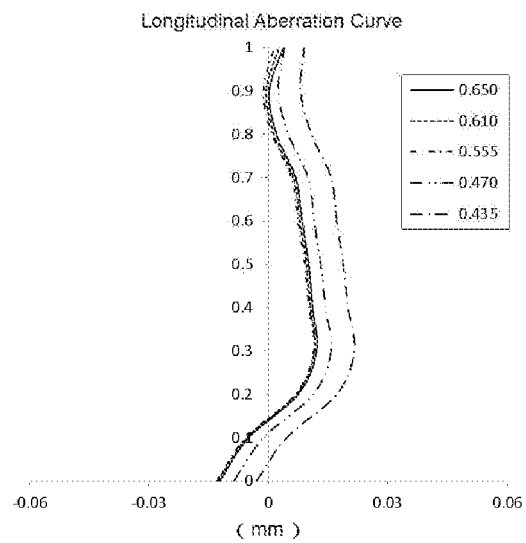
FIGS. 8A to 8D illustrate a longitudinal aberration curve, an astigmatic curve, a distortion curve, and a lateral color curve of the optical imaging lens assembly of the example 4, respectively.
Figure 8B:
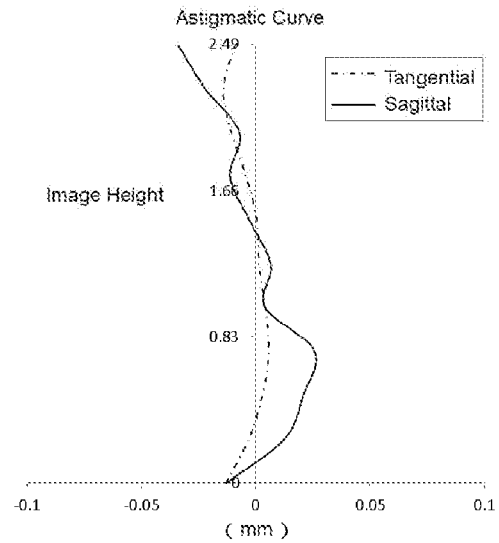
Figure 8C:
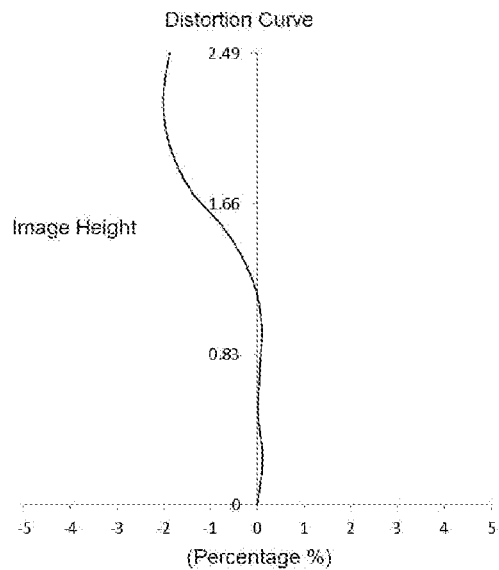
Figure 8D:
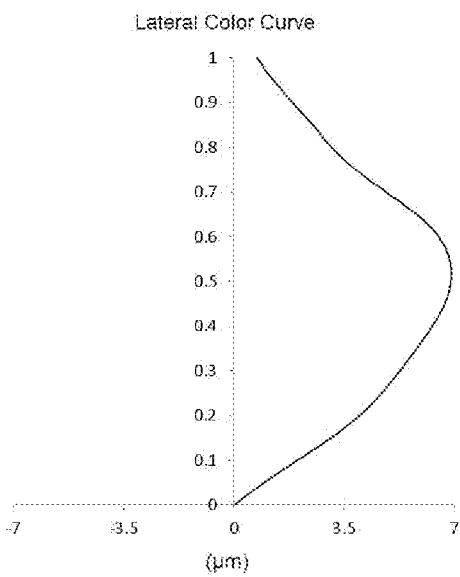

FIG. 8A illustrates a longitudinal aberration curve of the optical imaging lens assembly according to example 4, representing the deviations of focal points converged by light of different wavelengths after passing through the lens assembly. FIG. 8B illustrates an astigmatic curve of the optical imaging lens assembly according to example 4, representing the curvature of a tangential plane and the curvature of a sagittal plane. FIG. 8C illustrates a distortion curve of the optical imaging lens assembly according to example 4, representing the amounts of distortion corresponding to different image heights. FIG. 8D illustrates a lateral color curve of the optical imaging lens assembly according to example 4, representing the deviations of different image heights on an image plane after light passes through the lens assembly. It can be seen from FIG. 8A to FIG. 8D that the optical imaging lens assembly provided in example 4 can achieve good image quality.

Example 5

Figure 9:
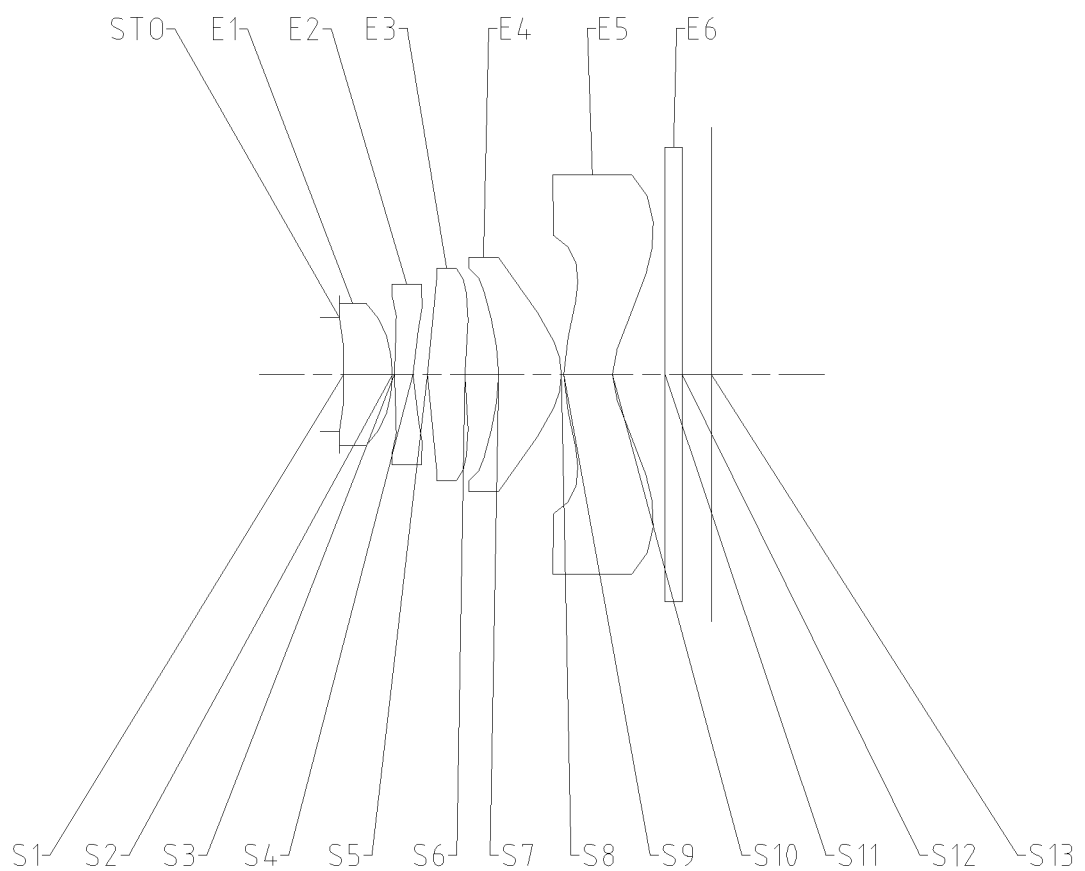
FIG. 9 illustrates a schematic structural diagram of an optical imaging lens assembly according to example 5 of the present disclosure.

An optical imaging lens assembly according to example 5 of the present disclosure is described below with reference to FIG. 9 to FIG. 10D. FIG. 9 illustrates a schematic structural diagram of the optical imaging lens assembly according to example 5 of the present disclosure.

As shown in FIG. 9, the optical imaging lens assembly includes, sequentially along an optical axis from an object side to an image side, a stop STO, a first lens E1, a second lens E2, a third lens E3, a fourth lens E4, a fifth lens E5, an optical filter E6 and an image plane S13.

The first lens E1 has positive refractive power, an object-side surface S1 thereof is concave, and an image-side surface S2 thereof is convex. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and finally forms an image on the image plane S13.

In this example, a total effective focal length f of the optical imaging lens assembly is 2.62 mm, a total track length TTL of the optical imaging lens assembly is 4.53 mm, half of a diagonal length ImgH of an effective pixel area on the image plane S13 of the optical imaging lens assembly is 2.44 mm, and half of a maximum field-of-view Semi-FOV of the optical imaging lens assembly is 42.7°.

Table 9 is a table showing basic parameters of the optical imaging lens assembly of example 5. Here, the units of the radius of curvature, the thickness/distance and the focal length are millimeter (mm). Table 10-1 and Table 10-2 show high-order coefficients applicable to each aspheric surface in example 5. Here, the surface type of each aspheric surface may be defined by the formula (1) given in the above example 1.

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ |  | Infinite | 350.0000 |  |  |  |  |
| STO |  | Infinite | 0.0525 |  |  |  |  |
| S1 | Aspheric | −54.3167 | 0.6006 | 1.55 | 56.1 | 3.28 | −99.0000 |
| S2 | Aspheric | −1.7379 | 0.0250 |  |  |  | −0.8058 |
| S3 | Aspheric | 4.6770 | 0.2306 | 1.67 | 20.4 | −4.96 | −13.7690 |
| S4 | Aspheric | 1.8978 | 0.1791 |  |  |  | −15.6308 |
| S5 | Aspheric | 2.2510 | 0.4612 | 1.55 | 56.1 | 10.87 | −36.9448 |
| S6 | Aspheric | 3.3637 | 0.4156 |  |  |  | −16.2069 |
| S7 | Aspheric | −2.1260 | 0.7723 | 1.67 | 56.1 | 2.21 | −0.2186 |
| S8 | Aspheric | −0.8676 | 0.0298 |  |  |  | −2.0742 |
| S9 | Aspheric | 1.6468 | 0.5987 | 1.64 | 23.5 | −2.96 | −16.0403 |
| S10 | Aspheric | 0.7583 | 0.6489 |  |  |  | −4.7025 |
| S11 |  | Infinite | 0.2100 | 1.51 | 64.2 |  |  |
| S12 |  | Infinite | 0.3604 |  |  |  |  |
| S13 |  | Infinite |  |  |  |  |  |

TABLE 10-1

| Surface number | $A_4$ | $A_6$ | $A_8$ | $A_{10}$ | $A_{12}$ | $A_{14}$ | $A_{16}$ |
|---|---|---|---|---|---|---|---|
| S1 | −3.5875E−02 | −2.3783E−03 | −2.5365E−04 | −4.4447E−05 | −3.0642E−06 | 3.1044E−06 | 9.0153E−06 |
| S2 | −7.8159E−02 | −6.0751E−03 | −1.0219E−04 | −3.4354E−04 | 1.1479E−04 | 6.8172E−05 | 2.4160E−05 |
| S3 | −9.1363E−02 | −8.4754E−03 | −6.4916E−04 | −9.6135E−05 | 1.0456E−04 | 2.4022E−04 | 1.9605E−05 |
| S4 | −6.1254E−02 | −1.7127E−02 | 1.2004E−03 | 6.2506E−07 | −4.3785E−04 | 4.6820E−04 | 1.7815E−05 |
| S5 | −5.7085E−02 | 2.5634E−02 | 5.8742E−03 | −5.0053E−03 | −1.6366E−03 | 4.6715E−04 | 2.6202E−04 |
| S6 | −2.5264E−01 | 1.1393E−02 | 2.6606E−03 | −3.1892E−03 | −5.5315E−03 | −1.9904E−03 | −9.2491E−05 |
| S7 | 1.5193E−01 | −3.8027E−02 | −8.6775E−03 | −4.1176E−03 | −1.5406E−03 | −1.2796E−03 | −1.6858E−04 |
| S8 | −1.4527E−02 | 2.2590E−02 | −3.4491E−03 | −2.3636E−03 | 5.6725E−04 | 1.7489E−03 | 4.6319E−04 |
| S9 | −3.3712E−01 | −8.4068E−02 | 4.0644E−04 | −8.0263E−03 | 7.5612E−04 | 5.4020E−05 | 2.8055E−04 |
| S10 | −8.0335E−01 | 8.9407E−03 | −1.2363E−02 | −4.7208E−03 | 2.1963E−03 | −1.2447E−03 | 6.6956E−04 |

TABLE 10-1

| Surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 5.6993E−06 | 3.8208E−06 | 0.0000E+00 | 0.0000E+00 | 0.0000E+00 | 0.0000E+00 | 0.0000E+00 |
| S2 | 3.4854E−05 | 1.6448E−05 | 0.0000E+00 | 0.0000E+00 | 0.0000E+00 | 0.0000E+00 | 0.0000E+00 |
| S3 | 6.0213E−05 | 3.8166E−06 | 0.0000E+00 | 0.0000E+00 | 0.0000E+00 | 0.0000E+00 | 0.0000E+00 |
| S4 | 1.0605E−04 | −1.8476E−05 | 0.0000E+00 | 0.0000E+00 | 0.0000E+00 | 0.0000E+00 | 0.0000E+00 |
| S5 | −2.1900E−04 | −1.2002E−04 | 0.0000E+00 | 0.0000E+00 | 0.0000E+00 | 0.0000E+00 | 0.0000E+00 |
| S6 | 2.6047E−04 | 7.2484E−05 | 0.0000E+00 | 0.0000E+00 | 0.0000E+00 | 0.0000E+00 | 0.0000E+00 |
| S7 | 9.1024E−05 | 1.3795E−04 | 0.0000E+00 | 0.0000E+00 | 0.0000E+00 | 0.0000E+00 | 0.0000E+00 |
| S8 | 5.6144E−04 | 1.8006E−04 | 1.9031E−04 | 0.0000E+00 | 0.0000E+00 | 0.0000E+00 | 0.0000E+00 |
| S9 | 3.1871E−04 | 7.2925E−05 | 1.4763E−04 | −4.6162E−05 | 3.3634E−05 | −3.2745E−05 | 0.0000E+00 |
| S10 | −1.7372E−04 | 1.9939E−04 | −1.4888E−04 | 1.1500E−04 | −1.0801E−04 | 0.0000E+00 | 0.0000E+00 |

Figure 10A:
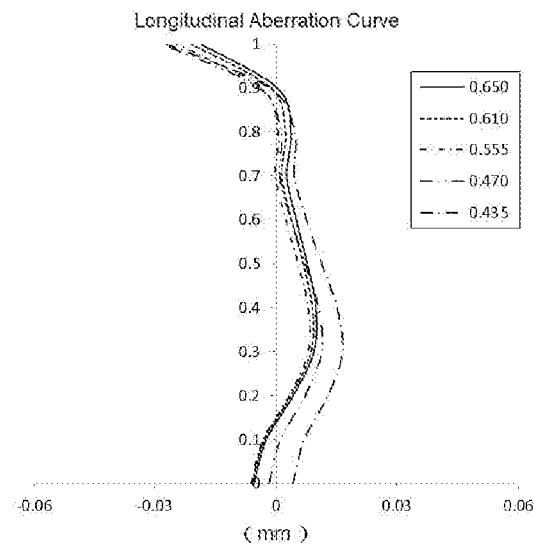
FIGS. 10A to 10D illustrate a longitudinal aberration curve, an astigmatic curve, a distortion curve, and a lateral color curve of the optical imaging lens assembly of the example 5, respectively.
Figure 10B:
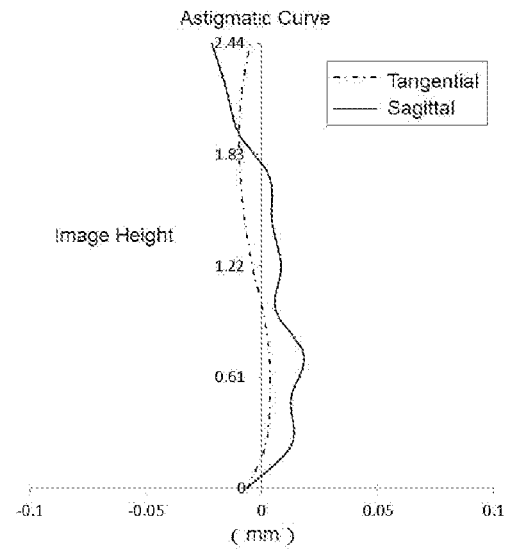
Figure 10C:
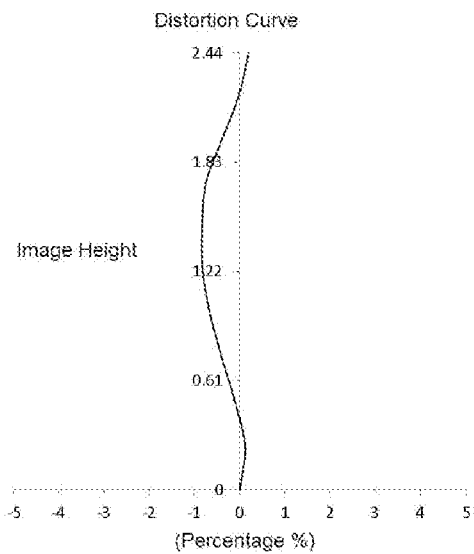
Figure 10D:
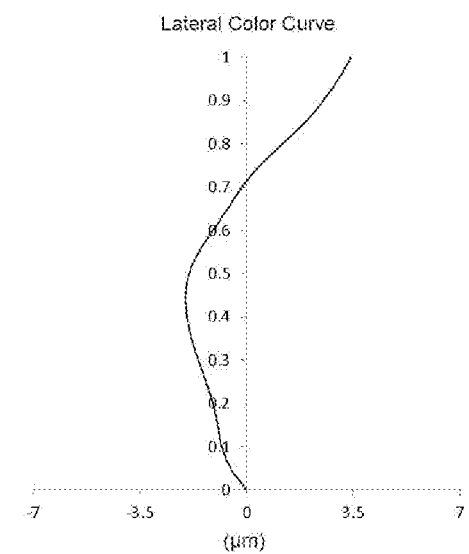

FIG. 10A illustrates a longitudinal aberration curve of the optical imaging lens assembly according to example 5, representing the deviations of focal points converged by light of different wavelengths after passing through the lens assembly. FIG. 10B illustrates an astigmatic curve of the optical imaging lens assembly according to example 5, representing the curvature of a tangential plane and the curvature of a sagittal plane. FIG. 10C illustrates a distortion curve of the optical imaging lens assembly according to example 5, representing the amounts of distortion corresponding to different image heights. FIG. 10D illustrates a lateral color curve of the optical imaging lens assembly according to example 5, representing the deviations of different image heights on an image plane after light passes through the lens assembly. It can be seen from FIG. 10A to FIG. 10D that the optical imaging lens assembly provided in example 5 can achieve good image quality.

Example 6

Figure 11:
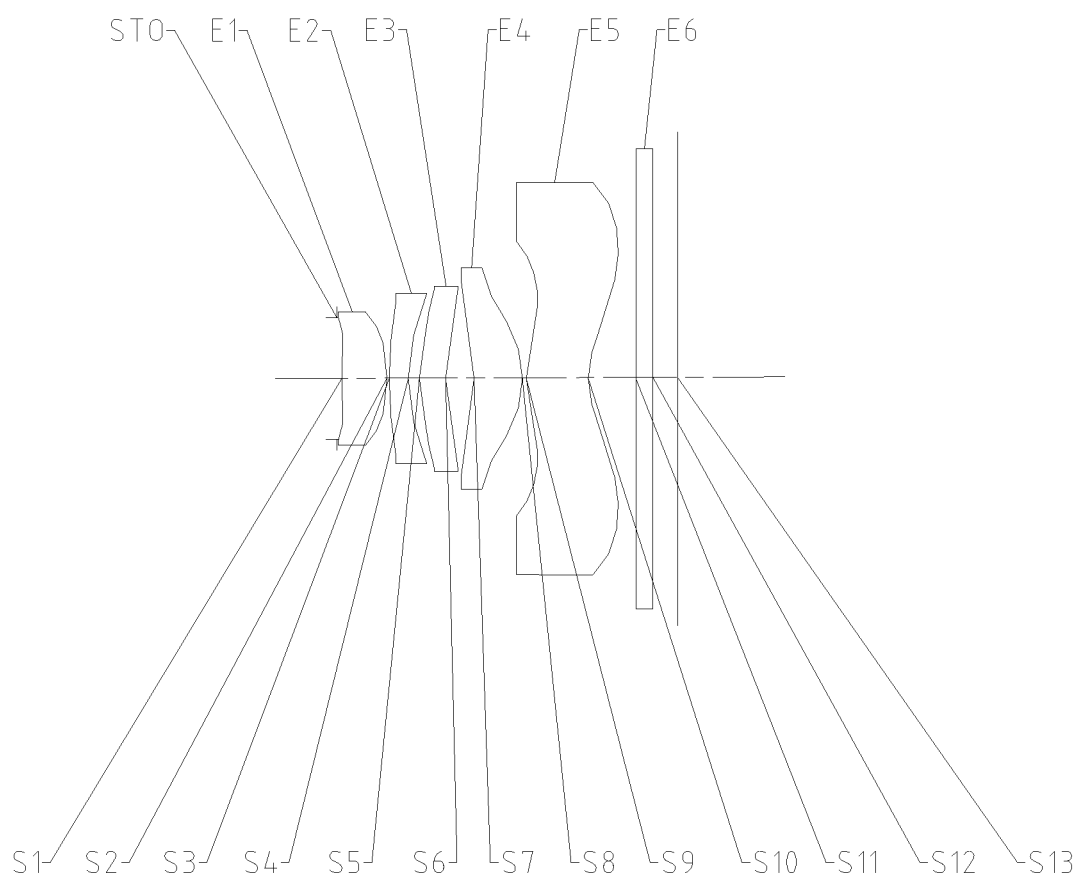
FIG. 11 illustrates a schematic structural diagram of an optical imaging lens assembly according to example 6 of the present disclosure.

An optical imaging lens assembly according to example 6 of the present disclosure is described below with reference to FIG. 11 to FIG. 12D. FIG. 11 illustrates a schematic structural diagram of the optical imaging lens assembly according to example 6 of the present disclosure.

As shown in FIG. 11, the optical imaging lens assembly includes, sequentially along an optical axis from an object side to an image side, a stop STO, a first lens E1, a second lens E2, a third lens E3, a fourth lens E4, a fifth lens E5, an optical filter E6 and an image plane S13.

The first lens E1 has positive refractive power, an object-side surface S1 thereof is convex, and an image-side surface S2 thereof is convex. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has positive refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and finally forms an image on the image plane S13.

In this example, a total effective focal length f of the optical imaging lens assembly is 2.64 mm, a total track length TTL of the optical imaging lens assembly is 4.14 mm, half of a diagonal length ImgH of an effective pixel area on the image plane S13 of the optical imaging lens assembly is 1.87 mm, and half of a maximum field-of-view Semi-FOV of the optical imaging lens assembly is 35.0°.

Table 11 is a table showing basic parameters of the optical imaging lens assembly of example 6. Here, the units of the radius of curvature, the thickness/distance and the focal length are millimeter (mm). Table 12-1 and Table 12-2 show high-order coefficients applicable to each aspheric surface in example 6. Here, the surface type of each aspheric surface may be defined by the formula (1) given in the above example 1.

TABLE 11

| Surface number | Surface type | Radius of curvature | Thickness/ Distance | Refractive index | Abbe number | Focal length | Conic coefficient |
|---|---|---|---|---|---|---|---|
| OBJ |  | Infinite | 350.0000 |  |  |  |  |
| STO |  | Infinite | 0.0635 |  |  |  |  |
| S1 | Aspheric | 5.7033 | 0.5552 | 1.55 | 56.1 | 3.25 | 54.7561 |
| S2 | Aspheric | −2.4866 | 0.0266 |  |  |  | 0.9636 |
| S3 | Aspheric | 5.6419 | 0.2350 | 1.67 | 20.4 | −5.80 | 6.2038 |
| S4 | Aspheric | 2.2556 | 0.1372 |  |  |  | −3.4485 |
| S5 | Aspheric | 1.4813 | 0.3228 | 1.55 | 56.1 | 11.66 | −18.9574 |
| S6 | Aspheric | 1.7823 | 0.3520 |  |  |  | −5.3980 |
| S7 | Aspheric | −1.8200 | 0.5952 | 1.67 | 56.1 | 9.43 | −1.9638 |
| S8 | Aspheric | −1.5000 | 0.0482 |  |  |  | −1.1943 |
| S9 | Aspheric | 1.2864 | 0.7629 | 1.64 | 23.5 | 37.36 | −15.5194 |
| S10 | Aspheric | 1.0431 | 0.5893 |  |  |  | −5.9693 |
| S11 |  | Infinite | 0.2100 | 1.51 | 64.2 |  |  |
| S12 |  | Infinite | 0.3021 |  |  |  |  |
| S13 |  | Infinite |  |  |  |  |  |

TABLE 12-1

| Surface number | $A_4$ | $A_6$ | $A_8$ | $A_{10}$ | $A_{12}$ | $A_{14}$ | $A_{16}$ |
|---|---|---|---|---|---|---|---|
| S1 | −8.7934E−02 | −9.1279E−03 | −1.6292E−03 | −4.1554E−04 | −1.5482E−04 | −4.8172E−05 | −2.2411E−05 |
| S2 | −1.0044E−01 | −6.5489E−04 | 2.4368E−04 | −6.7201E−04 | 2.3355E−04 | −9.1862E−05 | 3.2546E−05 |
| S3 | 4.4065E−04 | −1.5341E−03 | 1.9293E−03 | −1.7936E−03 | 1.9176E−04 | −1.9056E−04 | 3.2122E−05 |
| S4 | 2.5563E−02 | −1.0134E−02 | 8.3579E−05 | −6.3668E−04 | −9.7809E−04 | 1.4041E−05 | −9.5145E−05 |
| S5 | −2.8689E−02 | 2.0679E−03 | 1.1886E−02 | 4.3660E−04 | −4.9303E−04 | −1.1043E−03 | −1.7117E−05 |
| S6 | −1.4200E−01 | −1.4090E−04 | 5.5594E−03 | 5.0605E−03 | 2.4226E−03 | 4.6167E−04 | 1.1051E−04 |
| S7 | 2.3129E−01 | −3.5399E−02 | 1.1072E−03 | −4.3522E−03 | 5.6096E−04 | −4.0054E−04 | −1.4223E−04 |
| S8 | 3.6769E−02 | 9.7156E−02 | −2.7434E−02 | −7.8770E−03 | −5.1903E−03 | 3.7183E−03 | 3.4365E−04 |
| S9 | −4.5470E−01 | −5.3633E−03 | 1.2734E−02 | −1.0959E−02 | 2.0928E−03 | −1.6785E−03 | 1.2165E−03 |
| S10 | −8.0006E−01 | 1.0445E−02 | 1.9888E−03 | −1.4863E−02 | 8.3433E−03 | −5.9365E−03 | 4.0689E−03 |

TABLE 12-2

| Surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −2.0321E−06 | −5.1398E−06 | 0.0000E+00 | 0.0000E+00 | 0.0000E+00 | 0.0000E+00 | 0.0000E+00 |
| S2 | −1.6457E−05 | 2.9255E−06 | 0.0000E+00 | 0.0000E+00 | 0.0000E+00 | 0.0000E+00 | 0.0000E+00 |
| S3 | −1.8285E−06 | 1.5396E−05 | 0.0000E+00 | 0.0000E+00 | 0.0000E+00 | 0.0000E+00 | 0.0000E+00 |
| S4 | 8.3635E−05 | 1.3386E−05 | 0.0000E+00 | 0.0000E+00 | 0.0000E+00 | 0.0000E+00 | 0.0000E+00 |
| S5 | 5.7542E−05 | 1.1148E−04 | 0.0000E+00 | 0.0000E+00 | 0.0000E+00 | 0.0000E+00 | 0.0000E+00 |
| S6 | −4.8674E−05 | 1.0364E−05 | 0.0000E+00 | 0.0000E+00 | 0.0000E+00 | 0.0000E+00 | 0.0000E+00 |
| S7 | 6.7648E−05 | 9.7957E−05 | 1.2746E−04 | 2.9699E−05 | 2.5720E−05 | 0.0000E+00 | 0.0000E+00 |
| S8 | 4.5582E−04 | −5.0368E−04 | 9.9932E−05 | −4.1290E−05 | 4.5513E−05 | 0.0000E+00 | 0.0000E+00 |
| S9 | 2.8844E−04 | 3.6460E−04 | 2.1818E−04 | −1.9834E−05 | 1.6984E−05 | −5.7215E−05 | −7.6973E−06 |
| S10 | −1.9960E−03 | 1.6562E−03 | −7.5461E−04 | 4.1367E−04 | −2.8013E−04 | 1.4080E−04 | −4.3307E−05 |

Figure 12A:
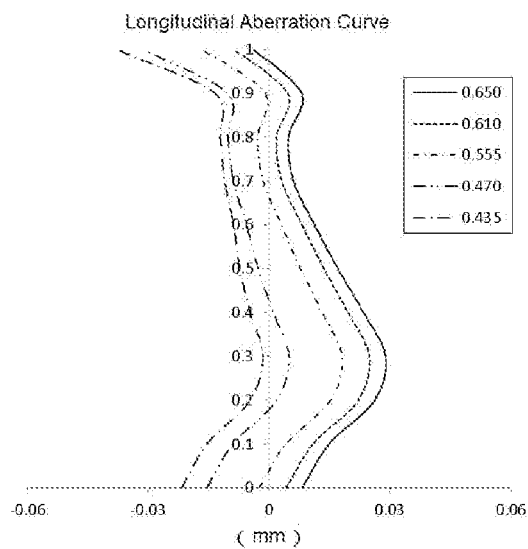
FIGS. 12A to 12D illustrate a longitudinal aberration curve, an astigmatic curve, a distortion curve, and a lateral color curve of the optical imaging lens assembly of the example 6, respectively.
Figure 12B:
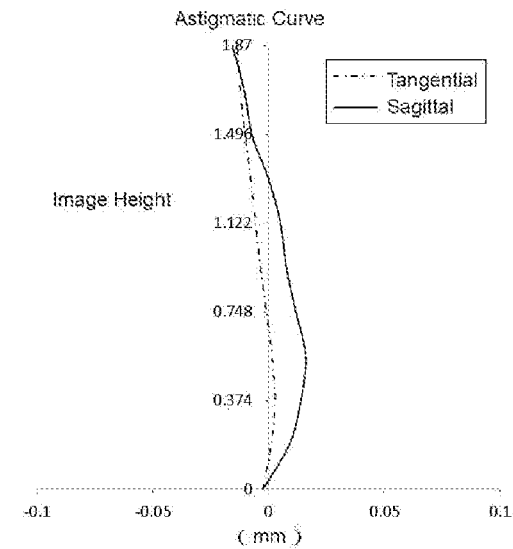
Figure 12C:
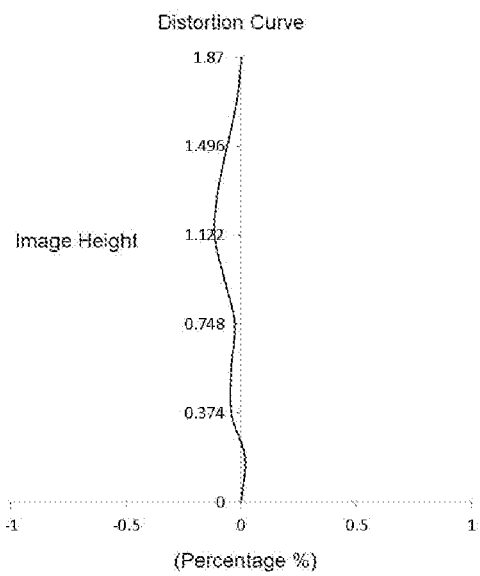
Figure 12D:
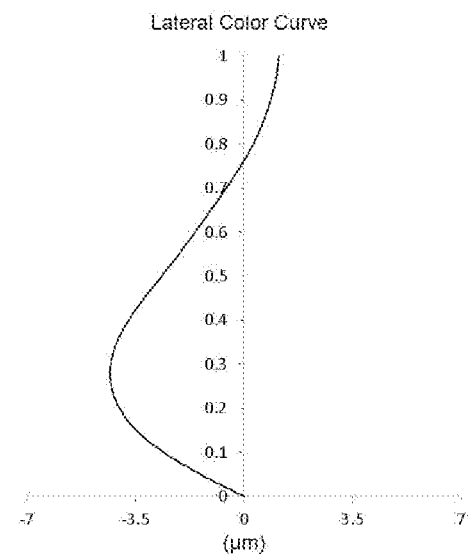

FIG. 12A illustrates a longitudinal aberration curve of the optical imaging lens assembly according to example 6, representing the deviations of focal points converged by light of different wavelengths after passing through the lens assembly. FIG. 12B illustrates an astigmatic curve of the optical imaging lens assembly according to example 6, representing the curvature of a tangential plane and the curvature of a sagittal plane. FIG. 12C illustrates a distortion curve of the optical imaging lens assembly according to example 6, representing the amounts of distortion corresponding to different image heights. FIG. 12D illustrates a lateral color curve of the optical imaging lens assembly according to example 6, representing the deviations of different image heights on an image plane after light passes through the lens assembly. It can be seen from FIG. 12A to FIG. 12D that the optical imaging lens assembly provided in example 6 can achieve good image quality.

Example 7

Figure 13:
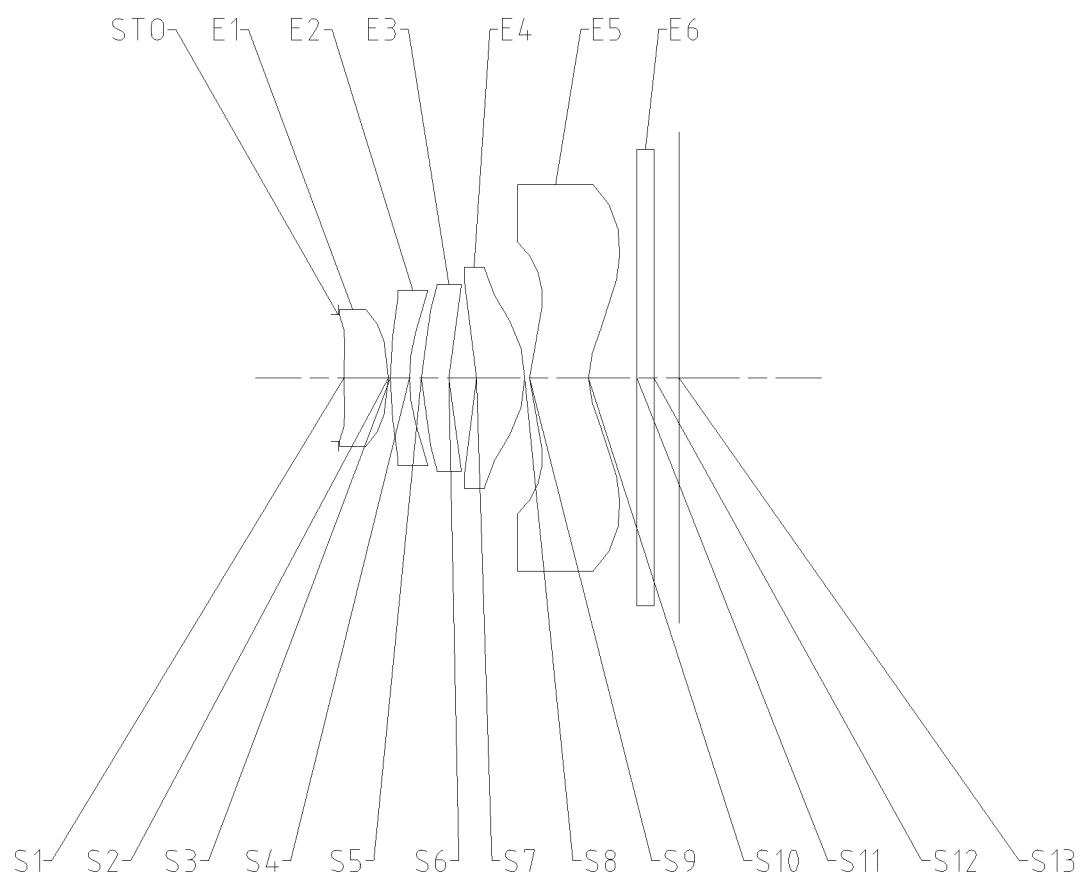
FIG. 13 illustrates a schematic structural diagram of an optical imaging lens assembly according to example 7 of the present disclosure.

An optical imaging lens assembly according to example 7 of the present disclosure is described below with reference to FIG. 13 to FIG. 14D. FIG. 13 illustrates a schematic structural diagram of the optical imaging lens assembly according to example 7 of the present disclosure.

As shown in FIG. 13, the optical imaging lens assembly includes, sequentially along an optical axis from an object side to an image side, a stop STO, a first lens E1, a second lens E2, a third lens E3, a fourth lens E4, a fifth lens E5, an optical filter E6 and an image plane S13.

The first lens E1 has positive refractive power, an object-side surface S1 thereof is convex, and an image-side surface S2 thereof is convex. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is concave, and an image-side surface S8 thereof is convex. The fifth lens E5 has positive refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and finally forms an image on the image plane S13.

In this example, a total effective focal length f of the optical imaging lens assembly is 2.62 mm, a total track length TTL of the optical imaging lens assembly is 4.20 mm, half of a diagonal length ImgH of an effective pixel area on the image plane S13 of the optical imaging lens assembly is 2.73 mm, and half of a maximum field-of-view Semi-FOV of the optical imaging lens assembly is 45.8°.

Table 13 is a table showing basic parameters of the optical imaging lens assembly of example 7. Here, the units of the radius of curvature, the thickness/distance and the focal length are millimeter (mm). Table 14-1 and Table 14-2 show high-order coefficients applicable to each aspheric surface in example 7. Here, the surface type of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ |  | Infinite | 350.0000 |  |  |  |  |
| STO |  | Infinite | 0.0728 |  |  |  |  |
| S1 | Aspheric | 5.8982 | 0.5458 | 1.55 | 56.1 | 3.31 | 52.6487 |
| S2 | Aspheric | −2.5194 | 0.0263 |  |  |  | −0.1243 |
| S3 | Aspheric | 5.2330 | 0.2350 | 1.67 | 20.4 | −5.67 | 5.0424 |
| S4 | Aspheric | 2.1544 | 0.1480 |  |  |  | −4.3123 |
| S5 | Aspheric | 1.5142 | 0.3367 | 1.55 | 56.1 | 10.45 | −20.7436 |
| S6 | Aspheric | 1.8996 | 0.3412 |  |  |  | −5.1548 |
| S7 | Aspheric | −1.8194 | 0.5937 | 1.67 | 56.1 | −59.24 | −2.2583 |
| S8 | Aspheric | −2.1500 | 0.0576 |  |  |  | 0.3194 |
| S9 | Aspheric | 0.9860 | 0.7282 | 1.64 | 23.5 | 5.81 | −9.6393 |
| S10 | Aspheric | 0.9507 | 0.5960 |  |  |  | −5.8029 |
| S11 |  | Infinite | 0.2100 | 1.51 | 64.2 |  |  |
| S12 |  | Infinite | 0.3088 |  |  |  |  |
| S13 |  | Infinite |  |  |  |  |  |

TABLE 14-1

| Surface number | $A_4$ | $A_6$ | $A_8$ | $A_{10}$ | $A_{12}$ | $A_{14}$ | $A_{16}$ |
|---|---|---|---|---|---|---|---|
| S1 | −9.8168E−02 | −1.0030E−02 | −1.7283E−03 | −4.0653E−04 | −1.4039E−04 | −3.5556E−05 | −1.8156E−05 |
| S2 | −1.0660E−01 | −2.5426E−03 | 2.7336E−04 | −6.4135E−04 | 1.5922E−04 | −5.0633E−05 | 1.0659E−05 |
| S3 | −1.2404E−04 | −4.5209E−03 | 1.4033E−03 | −1.7922E−03 | −1.1073E−04 | −1.3312E−04 | −3.1036E−05 |
| S4 | 1.9511E−02 | −1.2105E−02 | −2.1579E−03 | −7.0124E−04 | −1.5775E−03 | 5.1792E−05 | −1.1664E−04 |
| S5 | −2.7448E−02 | 7.9776E−03 | 1.3312E−02 | −8.8340E−04 | −8.5743E−04 | −1.2419E−03 | 1.0384E−04 |
| S6 | −1.5289E−01 | 2.1803E−04 | 8.7671E−03 | 6.0055E−04 | 2.8344E−03 | 3.5263E−04 | 7.2146E−05 |
| S7 | 2.4616E−01 | −4.9401E−02 | 4.2225E−03 | −3.5472E−03 | 1.5282E−03 | −7.7577E−04 | 2.6759E−05 |
| S8 | −8.6823E−02 | 1.4433E−01 | −4.5755E−02 | 4.2913E−03 | −8.4358E−03 | 4.6551E−03 | −9.0635E−04 |
| S9 | −5.8656E−01 | 1.7657E−02 | −5.4833E−03 | −1.3369E−03 | −8.9765E−04 | 9.2207E−04 | 3.7989E−04 |
| S10 | −8.1897E−01 | 4.4214E−03 | 3.1605E−03 | −1.4632E−02 | 9.5009E−03 | −6.6466E−03 | 4.8546E−03 |

TABLE 14-2

| Surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −7.8274E−07 | −9.3286E−06 | 0.0000E+00 | 0.0000E+00 | 0.0000E+00 | 0.0000E+00 | 0.0000E+00 |
| S2 | −1.7355E−05 | 8.0465E−06 | 0.0000E+00 | 0.0000E+00 | 0.0000E+00 | 0.0000E+00 | 0.0000E+00 |
| S3 | 3.8684E−05 | 1.6387E−05 | 0.0000E+00 | 0.0000E+00 | 0.0000E+00 | 0.0000E+00 | 0.0000E+00 |
| S4 | 1.4922E−04 | 2.9495E−05 | 0.0000E+00 | 0.0000E+00 | 0.0000E+00 | 0.0000E+00 | 0.0000E+00 |
| S5 | 9.7116E−05 | 1.2809E−04 | 0.0000E+00 | 0.0000E+00 | 0.0000E+00 | 0.0000E+00 | 0.0000E+00 |
| S6 | −6.6925E−05 | 2.1088E−05 | 0.0000E+00 | 0.0000E+00 | 0.0000E+00 | 0.0000E+00 | 0.0000E+00 |
| S7 | 7.0836E−05 | 2.3150E−04 | 1.4628E−04 | 6.0435E−05 | 1.6655E−05 | 0.0000E+00 | 0.0000E+00 |
| S8 | 1.1907E−03 | −4.7534E−04 | 2.6007E−04 | −1.5241E−04 | 2.1632E−05 | 0.0000E+00 | 0.0000E+00 |
| S9 | 1.2163E−03 | 2.5667E−05 | 4.9511E−04 | −2.2684E−04 | 2.2825E−05 | −1.3665E−04 | −1.9893E−05 |
| S10 | −2.4457E−03 | 2.1657E−03 | −9.3067E−04 | 5.5227E−04 | −3.6435E−04 | 1.9806E−04 | −7.5633E−05 |

Figure 14A:
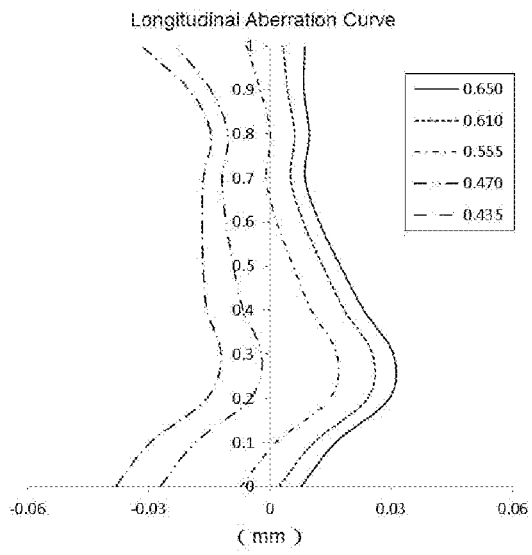
FIGS. 14A to 14D illustrate a longitudinal aberration curve, an astigmatic curve, a distortion curve, and a lateral color curve of the optical imaging lens assembly of the example 7, respectively.
Figure 14B:
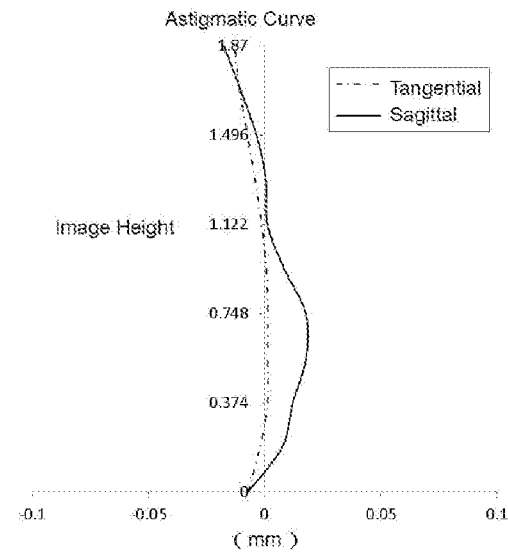
Figure 14C:
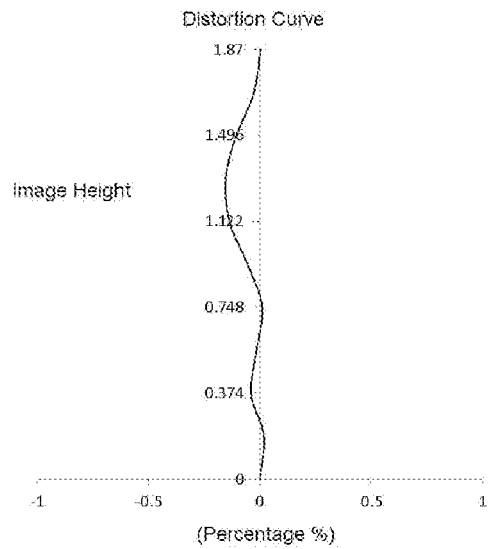
Figure 14D:
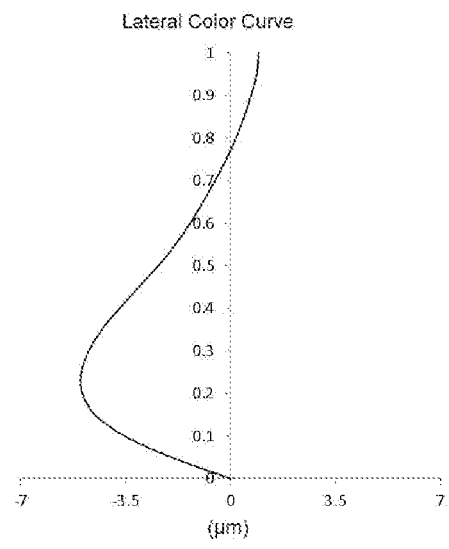

FIG. 14A illustrates a longitudinal aberration curve of the optical imaging lens assembly according to example 7, representing the deviations of focal points converged by light of different wavelengths after passing through the lens assembly. FIG. 14B illustrates an astigmatic curve of the optical imaging lens assembly according to example 7, representing the curvature of a tangential plane and the curvature of a sagittal plane. FIG. 14C illustrates a distortion curve of the optical imaging lens assembly according to example 7, representing the amounts of distortion corresponding to different image heights. FIG. 14D illustrates a lateral color curve of the optical imaging lens assembly according to example 7, representing the deviations of different image heights on an image plane after light passes through the lens assembly. It can be seen from FIG. 14A to FIG. 14D that the optical imaging lens assembly provided in example 7 can achieve good image quality.

In view of the above, examples 1 to 7 respectively satisfy the relationship shown in Table 15.

TABLE 15

| Conditional/Example | 1 | 2 | 3 | 4 | 5 | 6 | 7 |
|---|---|---|---|---|---|---|---|
| |f3/f2| | 2.13 | 1.46 | 4.18 | 3.12 | 2.19 | 2.01 | 1.84 |
| f/R8 | −3.48 | −3.67 | −3.28 | −3.23 | −3.02 | −1.76 | −1.22 |
| f/EPD | 1.90 | 1.90 | 2.25 | 2.25 | 1.95 | 1.84 | 1.75 |
| f45/f | 2.38 | 2.12 | 1.95 | 1.55 | 1.76 | 2.28 | 2.24 |
| |f/R2 + f/R5| | 0.79 | 1.13 | 0.23 | 1.04 | 0.34 | 0.72 | 0.69 |
| |f/R4 + f/R9| | 2.39 | 1.84 | 2.14 | 2.02 | 2.97 | 3.23 | 3.88 |
| SAG12/SAG41 | 1.39 | 1.19 | 1.14 | 3.79 | 0.90 | 1.55 | 1.67 |
| ImgH/DT32 | 1.67 | 1.61 | 2.23 | 2.10 | 1.90 | 1.67 | 2.41 |
| DT51/DT11 | 2.52 | 2.53 | 2.71 | 2.45 | 2.49 | 2.30 | 2.19 |
| DT52/DT12 | 2.98 | 2.97 | 3.03 | 3.00 | 2.88 | 3.01 | 2.89 |
| CT4/ET4 | 2.47 | 2.91 | 2.41 | 3.59 | 2.38 | 2.25 | 2.33 |
| ET5/CT5 | 1.32 | 1.66 | 1.28 | 1.88 | 1.59 | 1.24 | 1.27 |
| TTL/ΣET | 1.99 | 1.93 | 2.04 | 2.08 | 2.01 | 1.86 | 1.93 |
| f/ImgH | 1.42 | 1.45 | 1.06 | 1.13 | 1.07 | 1.42 | 0.92 |
| T34/CT3 | 1.16 | 1.34 | 1.07 | 1.14 | 0.90 | 1.09 | 1.01 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the inventive concept, such as, technical solutions formed by replacing the features as disclosed in the present disclosure with (but not limited to), technical features with similar functions.

What is claimed is:

1. An optical imaging lens assembly, comprising, sequentially along an optical axis from an object side to an image side:

a stop;

a first lens having positive refractive power or negative refractive power, an image-side surface of the first lens is convex;

a second lens having negative refractive power;

a third lens having positive refractive power, an image-side surface of the third lens is concave;

a fourth lens having positive refractive power or negative refractive power, an image-side surface of the fourth lens is convex; and a fifth lens having positive refractive power or negative refractive power, wherein at least one of an object-side surface and an image-side surface of the first lens to the fifth lens is aspheric, f2≤−4.3 mm, T34≥0.3176 mm, 1.0<|f3/f2|<5.0, 1.84≤|f/R4+f/R9|<4.0, 0.69≤|f/R2+f/R5|<1.5, 0.8<T34/CT3<1.5, 2.0<CT4/ET4<4.0, and
0.5<SAG12/SAG41<4.0,
where f2 is an effective focal length of the second lens, f3 is an effective focal length of the third lens, f is a total effective focal length of the optical imaging lens assembly, R4 is a radius of curvature of an image-side surface of the second lens, R9 is a radius of curvature of an object-side surface of the fifth lens, R2 is a radius of curvature of the image-side surface of the first lens, R5 is a radius of curvature of an object-side surface of the third lens, T34 is a spaced interval between the third lens and the fourth lens along the optical axis, CT3 is a center thickness of the third lens along the optical axis, CT4 is a center thickness of the fourth lens along the optical axis, ET4 is an edge thickness of the fourth lens, SAG41 is a distance along the optical axis from an intersection of an object-side surface of the fourth lens and the optical axis to a point projected from a vertex of an effective radius of the object-side surface of the fourth lens onto the optical axis, and SAG12 is a distance along the optical axis from an intersection of the image-side surface of the first lens and the optical axis to a point projected from a vertex of an effective radius of the image-side surface of the first lens onto the optical axis.

2. The optical imaging lens assembly according to claim 1, wherein −4.0<f/R8<−1.0,
where R8 is a radius of curvature of the image-side surface of the fourth lens.

3. The optical imaging lens assembly according to claim 1, wherein 1.5≤f45/f≤2.5,
where f45 is a combined focal length of the fourth lens and the fifth lens.

4. The optical imaging lens assembly according to claim 1, wherein 1.46≤|f3/f2|<5.0.

5. The optical imaging lens assembly according to claim 1, wherein 1.0 <ImgH/DT32<2.5,
where DT32 is a maximum effective radius of the image-side surface of the third lens, and ImgH is half of a diagonal length of an effective pixel area on an image plane of the optical imaging lens assembly.

6. The optical imaging lens assembly according to claim 1, wherein 2.0<DT51/DT11<3.5,
where DT51 is a maximum effective radius of the object-side surface of the fifth lens, and DT11 is a maximum effective radius of the object-side surface of the first lens.

7. The optical imaging lens assembly according to claim 1, wherein 1.0<ET5/CT5<2.0,
where ET5 is an edge thickness of the fifth lens, and CT5 is a center thickness of the fifth lens along the optical axis.

8. The optical imaging lens assembly according to claim 1, wherein 0.5<TTL/ΣET<2.5,
where TTL is a distance along the optical axis from the object-side surface of the first lens to an image plane of the optical imaging lens assembly, and ΣET is a sum of edge thicknesses of the first lens to the fifth lens.

9. The optical imaging lens assembly according to claim 1, wherein f/EPD<2.5,
where EPD is an entrance pupil diameter of the optical imaging lens assembly.

10. The optical imaging lens assembly according to claim 1, wherein 0.9<f/ImgH<1.6,
where ImgH is half of a diagonal length of an effective pixel area on an image plane of the optical imaging lens assembly.

11. The optical imaging lens assembly according to claim 1, wherein 0.9≤T34/CT3≤1.34.

12. An optical imaging lens assembly, comprising, sequentially along an optical axis from an object side to an image side:
a stop;
a first lens having positive refractive power or negative refractive power, an image-side surface of the first lens is convex;
a second lens having negative refractive power;
a third lens having positive refractive power, an image-side surface of the third lens is concave;
a fourth lens having positive refractive power or negative refractive power, an image-side surface of the fourth lens is convex; and
a fifth lens having positive refractive power or negative refractive power,
wherein at least one of an object-side surface and an image-side surface of the first lens to the fifth lens is aspheric,
f2≤−4.3 mm,
T34≥0.3176 mm,
1.0<|f3/f2|<5.0,
1.84≤|f/R4+f/R9|<4.0,
0.69≤|f/R2+f/R5|<1.5,
0.8<T34/CT3<1.5, and
0.5<SAG12/SAG41<4.0,
where f2 is an effective focal length of the second lens, f3 is an effective focal length of the third lens, f is a total effective focal length of the optical imaging lens assembly, R4 is a radius of curvature of an image-side surface of the second lens, R9 is a radius of curvature of an object-side surface of the fifth lens, R2 is a radius of curvature of the image-side surface of the first lens, R5 is a radius of curvature of an object-side surface of the third lens, T34 is a spaced interval between the third lens and the fourth lens along the optical axis, CT3 is a center thickness of the third lens along the optical axis, SAG41 is a distance along the optical axis from an intersection of an object-side surface of the fourth lens and the optical axis to a point projected from a vertex of an effective radius of the object-side surface of the fourth lens onto the optical axis, and SAG12 is a distance along the optical axis from an intersection of the image-side surface of the first lens and the optical axis to a point projected from a vertex of an effective radius of the image-side surface of the first lens onto the optical axis.

13. The optical imaging lens assembly according to claim 12, wherein 1.5≤f45/f≤2.5,
where f45 is a combined focal length of the fourth lens and the fifth lens.

14. The optical imaging lens assembly according to claim 12, wherein 1.46≤|f3/f2|<5.0.

15. The optical imaging lens assembly according to claim 12, wherein 1.0<ImgH/DT32<2.5,
where DT32 is a maximum effective radius of the image-side surface of the third lens, and ImgH is half of a diagonal length of an effective pixel area on an image plane of the optical imaging lens assembly.

16. The optical imaging lens assembly according to claim 12, wherein 2.0<DT51/DT11<3.5,
where DT51 is a maximum effective radius of the object-side surface of the fifth lens, and DT11 is a maximum effective radius of the object-side surface of the first lens.

17. The optical imaging lens assembly according to claim 12, wherein $0.5 < TTL/\Sigma ET < 2.5$,
where TTL is a distance along the optical axis from the object-side surface of the first lens to an image plane of the optical imaging lens assembly, and $\Sigma ET$ is a sum of edge thicknesses of the first lens to the fifth lens.

\* \* \* \* \*